US010893157B2

(12) United States Patent
Katsumata

(10) Patent No.: US 10,893,157 B2
(45) Date of Patent: Jan. 12, 2021

(54) INFORMATION PROCESSING SYSTEM AND INFORMATION PROCESSING APPARATUS

(71) Applicant: Motoyuki Katsumata, Kanagawa (JP)

(72) Inventor: Motoyuki Katsumata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/656,699

(22) Filed: Oct. 18, 2019

(65) Prior Publication Data

US 2020/0177746 A1   Jun. 4, 2020

(30) Foreign Application Priority Data

Nov. 30, 2018  (JP) ................................ 2018-226115

(51) Int. Cl.
| | |
|---|---|
| *H04N 1/00* | (2006.01) |
| *G06F 3/12* | (2006.01) |
| *G10L 15/26* | (2006.01) |
| *G10L 15/22* | (2006.01) |

(52) U.S. Cl.
CPC ....... *H04N 1/00403* (2013.01); *G06F 3/1204* (2013.01); *G06F 3/1238* (2013.01); *G10L 15/22* (2013.01); *G10L 15/26* (2013.01); *H04N 1/00395* (2013.01); *G10L 2015/223* (2013.01)

(58) Field of Classification Search
CPC ............ H04N 1/00403; H04N 1/00395; G06F 3/1204; G06F 3/1238; G10L 15/22; G10L 15/26; G10L 2015/223
USPC ....................................................... 358/1.14
See application file for complete search history.

(56) References Cited

U.S. PATENT DOCUMENTS

| | | | | |
|---|---|---|---|---|
| 2015/0222770 A1* | 8/2015 | Yoshida | ............. | H04N 1/00389 |
| | | | | 358/1.15 |
| 2016/0077771 A1 | 3/2016 | Monden | | |
| 2017/0109110 A1* | 4/2017 | Kitagata | ............... | G06F 3/1287 |
| 2017/0147267 A1* | 5/2017 | Yanagi | ............... | G06K 9/00469 |
| 2017/0208181 A1* | 7/2017 | Kim | ..................... | H04N 1/0023 |

(Continued)

FOREIGN PATENT DOCUMENTS

| | | |
|---|---|---|
| JP | 2003-051887 | 2/2003 |
| JP | 2006-129356 | 5/2006 |

(Continued)

*Primary Examiner* — Allen H Nguyen
(74) *Attorney, Agent, or Firm* — Oblon, McClelland, Maier & Neustadt, L.L.P.

(57) ABSTRACT

An information processing system includes a server including first circuitry and a first memory and an information processing apparatus including second circuitry and connectable to the server via a communication network. The second circuitry of the information processing apparatus acquires, as logged-in user information, information input by a user when logging in to the information processing apparatus, and transmits the logged-in user information to the server. The first circuitry of the server stores the logged-in user information in the first memory, acquires a user request to the information processing apparatus based on audio information of voice input via a terminal, converts user identifying information in the user request into the logged-in user information, and transmits the user request including the logged-in user information to the information processing apparatus to instruct the information processing apparatus to execute the user request.

12 Claims, 16 Drawing Sheets

(56) References Cited

U.S. PATENT DOCUMENTS

| | | | | |
|---|---|---|---|---|
| 2017/0238144 A1* | 8/2017 | Chatani | ............... | G06F 13/00 |
| | | | | 455/456.3 |
| 2017/0358302 A1* | 12/2017 | Orr | ............... | G06F 16/433 |
| 2018/0150280 A1* | 5/2018 | Rhee | ............... | G06F 3/0488 |
| 2019/0304453 A1 | 10/2019 | Nakamura | | |
| 2019/0306341 A1* | 10/2019 | Matysiak | ............... | G06F 3/1292 |

FOREIGN PATENT DOCUMENTS

| | | |
|---|---|---|
| JP | 2016-060078 | 4/2016 |
| JP | 2017-167685 | 9/2017 |

* cited by examiner

| printColor | |
|---|---|
| ☑ Define synonyms  ⓘ  ☐ Allow automated expansion | |
| auto_color | auto_color |
| monochrome | monochrome, black and white |
| color | color, full color |
| two_color | two color |
| single color | single color |
| red_and_black | red and black |

FIG. 10

| Add user expression |
|---|
| Please copy this with settings: two-color, double-sided, and 2 in 1. |
| Please copy document with settings: Tray 1, fitting, and double-sided. |
| Make two copies of this document in dark monochrome. |
| Make three copies with 4 in 1. |
| Execute copy with settings: color and auto tray. |
| Please copy this document at 80% from Tray 1. |
| Copy dark on one side. |
| Copy dark in black and white. |

Action

| copy |
|---|

| Entity | | ENTITY ⑦ | VALUE |
|---|---|---|---|
| ☐ | copies | @copies | Scopies |
| ☐ | paperTray | @paperTray | SpaperTray |
| ☐ | magnification | @magnification | Smagnification |
| ☐ | printColor | @printColor | SprintColor |
| ☐ | printSide | @printSide | SprintSide |
| ☐ | combine | @combine | Scombine |
| ☐ | density | @density | Sdensity |
| | ⋮ | ⋮ | ⋮ |

INFORMATION PROCESSING SYSTEM AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2018-226115 filed on Nov. 30, 2018 in the Japan Patent Office, the entire disclosure of which is hereby incorporated by reference herein.

BACKGROUND

Technical Field

The present invention relates to an information processing system and an information processing apparatus.

Description of the Related Art

There is a technique of transmitting an operation instruction from a mobile terminal to a server and transmitting an operation signal from the server to an apparatus to operate the apparatus.

For example, there is a method of transmitting audio data acquired by a mobile terminal to a server, converting the audio data into a control command with the server, and transmitting the control command to an apparatus.

According to the method, however, each time a user specifies themselves as the address to which data is to be transmitted, the user specifies their identification to the terminal even when the user is already logged in to the apparatus that the user intends to operate, which reduces user convenience.

SUMMARY

In one embodiment of this invention, there is provided an improved information processing system that includes, for example, a server and an information processing apparatus. The server includes first circuitry and a first memory. The information processing apparatus includes second circuitry, and is connectable to the server via a communication network. The second circuitry of the information processing apparatus acquires, as logged-in user information, information input by a user when the user logs in to the information processing apparatus, and transmits the logged-in user information to the server. The first circuitry of the server stores the transmitted logged-in user information in the first memory, acquires a user request to the information processing apparatus based on audio information of voice input via a terminal, converts user identifying information included in the user request into the logged-in user information stored in the first memory, and transmits the user request including the converted logged-in user information to the information processing apparatus to instruct the information processing apparatus to execute the user request.

In one embodiment of this invention, there is provided an improved information processing system that includes, for example, a server and an information processing apparatus. The server includes first circuitry. The information processing apparatus includes second circuitry, and is connectable to the server via a communication network. The first circuitry of the server transmits a user request to the information processing apparatus based on audio information of voice input via a terminal. The second circuitry of the information processing apparatus acquires, as logged-in user information, information input by a user when the user logs in to the information processing apparatus, converts user identifying information included in the user request into the logged-in user information, and executes the user request including the converted logged-in user information.

In one embodiment of this invention, there is provided an improved information processing apparatus that includes, for example, circuitry that receives, via a server, a user request generated based on audio information of voice input via a terminal, acquires, as logged-in user information, information input by a user when the user logs in to the information processing apparatus, converts user identifying information included in the user request received via the server into the logged-in user information, and executes the user request including the converted logged-in user information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is a diagram illustrating examples of user utterance phrases, action name, and entity information of the embodiment;

Figure 1:
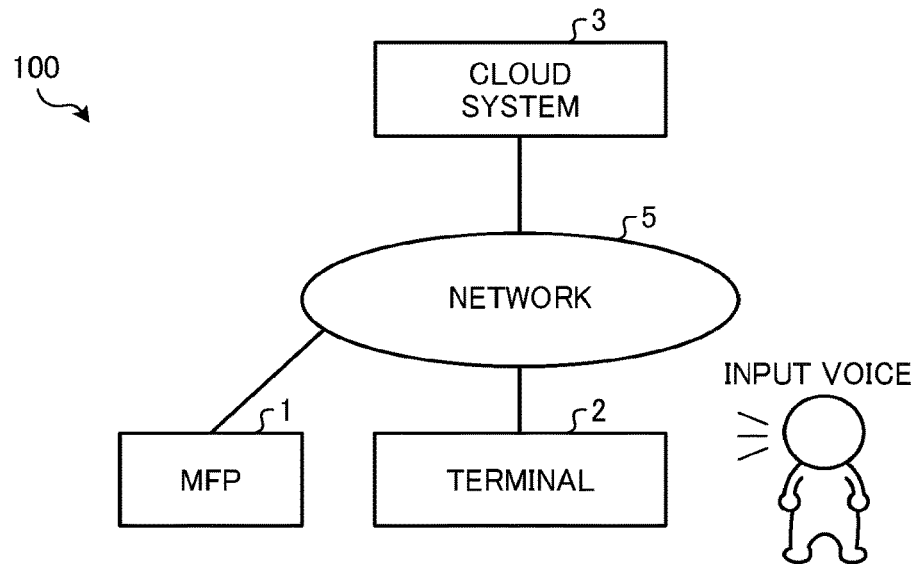
FIG. 1 is a diagram illustrating an example of general arrangement of a voice operation system of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an information processing system, an information processing apparatus, and an information processing method of the present invention will be described below with reference to the accompanying drawings. The following description will be given of an example of application to an information processing system that enables the operation of an information processing apparatus, such as an image processing apparatus or an electronic apparatus, via a terminal such as a smart speaker with a service provided by a cloud system.

A system configuration of an information processing system of an embodiment of the present invention will be described.

FIG. 1 is a diagram illustrating an example of general arrangement of the information processing system of the embodiment. FIG. 1 illustrates general arrangement of a voice operation system 100 as an example of the information processing system of the embodiment.

As illustrated in FIG. 1, the voice operation system 100 of the present example includes at least one multifunction peripheral (MFP) 1 (an example of second circuitry), at least one terminal 2, and a cloud system 3 (an example of first circuitry). The MFP 1 is an example of an information processing apparatus such as an image processing apparatus. The MFP 1 has a plurality of functions, such as a printer function, a scanner function, and a facsimile (FAX) function, for example. The information processing apparatus may be another apparatus other than the MFP. For example, the information processing apparatus may be an apparatus with one of the plurality of functions such as the printer function, the scanner function, and the FAX function. That is, the information processing apparatus may be a printer, a scanner, or a FAX terminal, for example. Further, the information processing apparatus may be office equipment, such as an electronic whiteboard or a projector, or may be a different type of electronic apparatus other than the image processing apparatus. The terminal 2 is a device capable of transmitting an operation instruction to the MFP 1 via a network 5, such as a smart speaker, a smartphone, or a tablet terminal. The following description will be given on the assumption that the terminal 2 of the present example is a smart speaker.

A smart speaker receives voice input from a service user (hereinafter simply referred to as the user) requesting an operation of the MFP 1, and outputs audio feedback to the user as a response to the received operation. The smart speaker may include a touch display panel. In this case, a message to the user may be displayed on the touch display panel. In the present example described below, a smart speaker with a touch display panel is used as the terminal 2.

The at least one MFP 1 and the at least one terminal 2 are configured to be connectable to the network 5 to be connected to the cloud system 3 via the network 5. In the present example, in which the terminal 2 is a smart speaker, one smart speaker is placed near one MFP 1 to operate the MFP 1.

The cloud system 3 is implemented by one or more servers (i.e., cloud service apparatuses 3a in FIG. 4) residing on the network 5. Via the network 5, the cloud system 3 provides a service enabling the user to operate the MFP 1 via the terminal 2 (hereinafter referred to as the cloud service).

The network 5 is a communication network, such as a local area network (LAN) or the Internet, for example. Each of the MFP 1 and the terminal 2 includes a communication device. With the communication device, the MFP 1 and the terminal 2 are connected by wire or wirelessly to a network, such as an in-house LAN or a public network, to access the cloud system 3 via the Internet, for example.

As described in detail later, the terminal 2 performs data communication with the cloud system 3 (e.g., transmission and reception of audio data, text data, or image data for a user interface (UI)). The cloud system 3 analyzes the audio data (i.e., audio information) received from the terminal 2, and converts the audio data into text data. The cloud system 3 further interprets the intention of the user based on the text data and previously registered dictionary information. Further, when the instruction from the user is confirmed, for example, the cloud system 3 converts the user instruction into a job execution command (i.e., user request) in a format compatible with the MFP 1, and transmits the job execution command to the MFP 1. The MFP 1 executes the job execution command transmitted from the cloud system 3.

A hardware configuration of the MFP 1 will be described.

Figure 2:
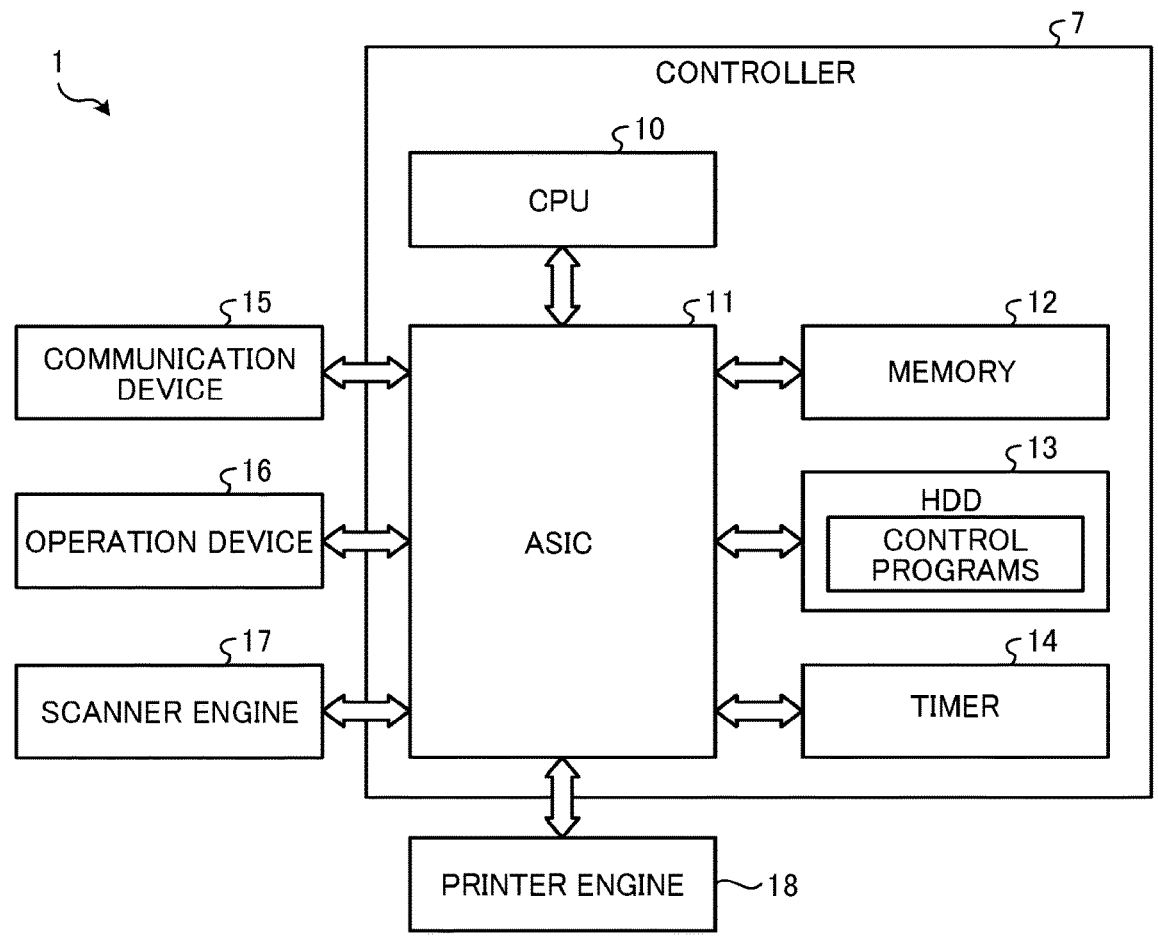
FIG. 2 is a diagram illustrating an example of the hardware configuration of a multifunction peripheral (MFP) forming the voice operation system of the embodiment.

FIG. 2 is a diagram illustrating an example of the hardware configuration of the MFP 1. As illustrated in FIG. 2, the MFP 1 includes a controller 7, a communication device 15, an operation device 16, a scanner engine 17, and a printer engine 18. The MFP 1 further includes an alarm device that communicates a message to the user with sound or light, for example.

The controller 7 includes a central processing unit (CPU) 10, an application specific integrated circuit (ASIC) 11, a memory 12, a hard disk drive (HDD) 13, and a timer 14, which are communicably connected to each other via a bus line.

The communication device 15 is connected to the network 5 to communicate with the cloud system 3. The communication device 15 transmits apparatus information of the MFP 1 to the cloud system 3, and acquires an instruction from the cloud system 3 as the job execution command. The instruction is a scan instruction or a print instruction, for example, input in voice via the terminal 2.

The operation device 16 is implemented as a touch panel integrating a liquid crystal display (LCD) and a touch sensor. When specifying settings or issuing a job execution command, the user touches and operates a software key of the operation device 16 (i.e., an operation button displayed on the operation device 16). In the present embodiment, the operation of the MFP 1 such as the setting of the MFP 1 is performed based on voice input to the terminal 2. However, it is also possible to instruct the controller 7 to execute settings or an operation through normal (i.e., manual) operation of the operation device 16. Particularly when performing a printing or scanning operation with the MFP 1, a final execution operation after various settings is desired to be performed with an operation button of the operation device 16 of the MFP 1.

The scanner engine 17 is a controller that controls an image reading device to optically read a document. The printer engine 18 is a controller that controls an image forming device to print an image on a transfer sheet, for example. The CPU 10 performs overall control of the MFP 1. The ASIC 11 is implemented as a large-scale integration (LSI) circuit that performs various image processing for images to be processed by the scanner engine 17 and the printer engine 18. The CPU 10 selectively executes various applications, such as a scanner application and a printer application, to thereby cause various engines to execute the job execution command with the respective applications.

The memory 12 stores fixed data. The HDD 13 (an example of a second memory) stores control programs and data. The control programs and data include an operating system (OS), various applications, image data for use in the execution of the applications, font data, and various files. The controller 7 may include a solid state drive (SSD) in place of or in addition to the HDD 13.

A hardware configuration of the terminal 2 will be described.

Figure 3:
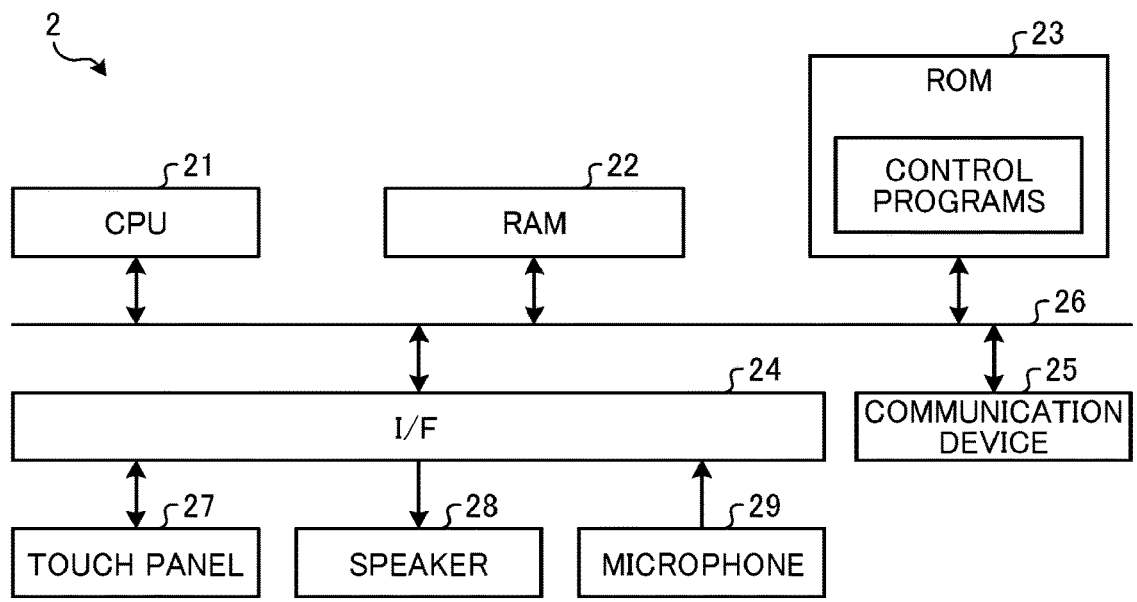
FIG. 3 is a diagram illustrating an example of the hardware configuration of a terminal forming the voice operation system of the embodiment.

FIG. 3 is a diagram illustrating an example of the hardware configuration of the terminal 2. As illustrated in FIG. 3, the terminal 2 includes a CPU 21, a random access memory (RAM) 22, a read only memory (ROM) 23, an interface (I/F) 24, and a communication device 25, which are connected to each other via a bus line 26.

The ROM 23 stores control programs. The control programs include an operation processing program. The CPU 21 executes the control programs stored in the ROM 23. The RAM 22 is used as a work area of the CPU 21.

The I/F 24 is connected to a touch panel 27, a speaker 28, and a microphone 29. The microphone 29 collects voices of telephone call conversations and user utterances, for example, and inputs the voices as audio signals. The speaker 28 outputs sound as a response to the user, for example. The touch panel 27 receives an operation performed thereon by the user, and displays data, such as text data or image data, to the user.

The thus-configured terminal 2 transmits the audio signals input via the microphone 29 to the cloud system 3 via the communication device 25. The terminal 2 further performs control such as causing the touch panel 27 to display the data (e.g., audio data, text data, or image data) acquired from the cloud system 3 via the communication device 25 and causing the speaker 28 to output the audio data as sound.

A hardware configuration of the cloud system 3 will be described.

Figure 4:
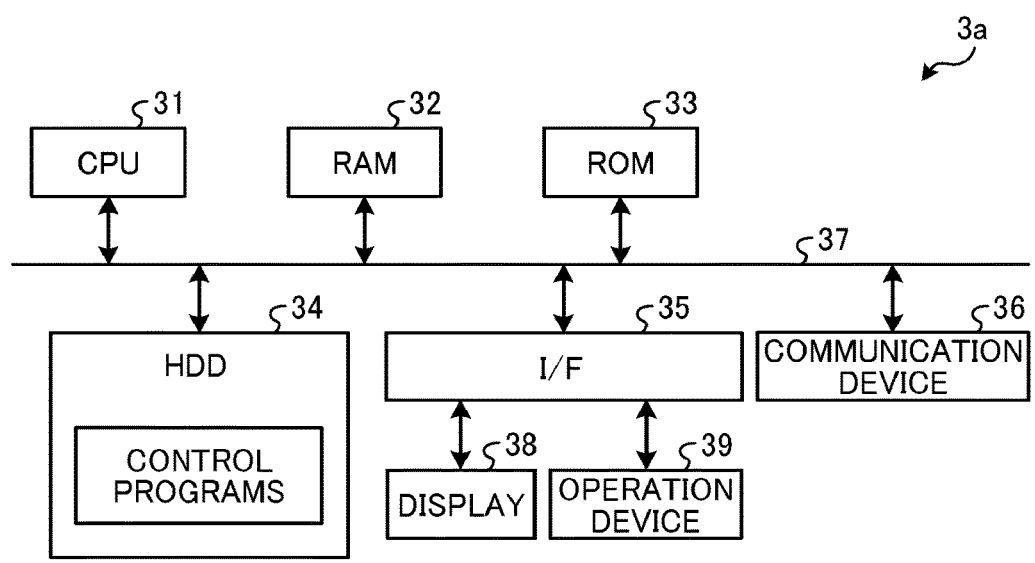
FIG. 4 is a diagram illustrating an example of the hardware configuration of a cloud service apparatus forming the voice operation system of the embodiment.

The cloud system 3 provides the cloud service with one server or a plurality of servers cooperating with each other. FIG. 4 is a diagram illustrating an example of the hardware configuration of such a server (hereinafter referred to as the cloud service apparatus 3a).

Figure 5:
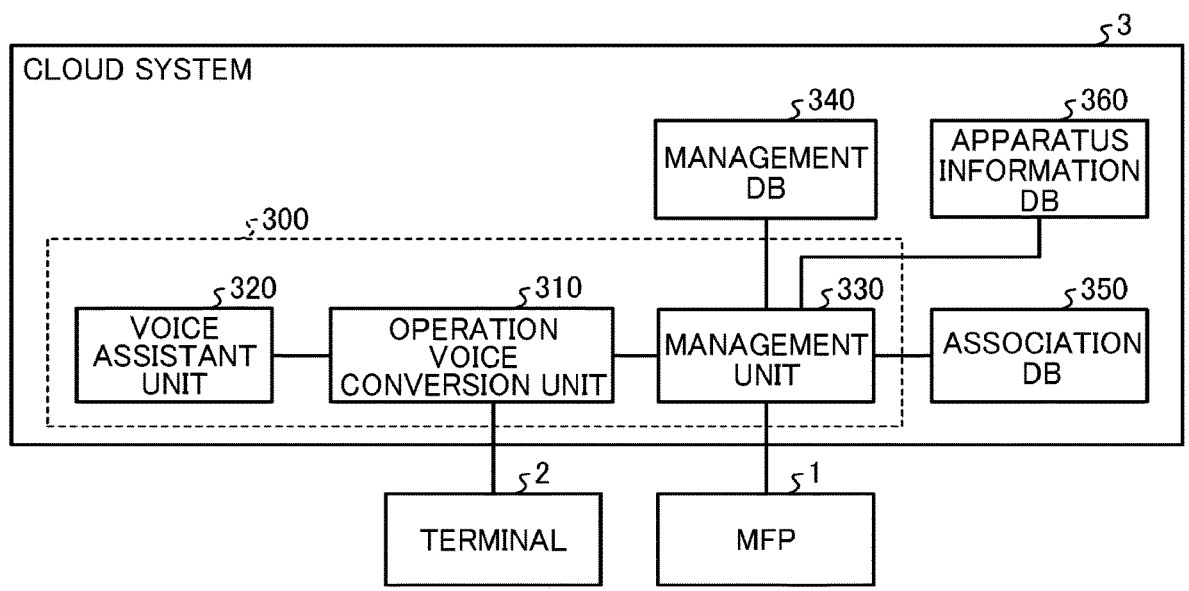
FIG. 5 is a diagram illustrating overall functions of a cloud system forming the voice operation system of the embodiment.

As illustrated in FIG. 4, the cloud service apparatus 3a includes a CPU 31, a RAM 32, a ROM 33, an HDD 34, an I/F 35, and a communication device 36, which are connected to each other via a bus line 37. The I/F 35 is connected to a display 38 and an operation device 39. The HDD 34 (an example of a first memory) stores control programs and databases. The control programs include an operation voice conversion program, a voice assistant program, and a management program, for example. The databases include a management database (DB) 340, an association DB 350, and an apparatus information DB 360, for example, as illustrated in FIG. 5.

The ROM 33 stores fixed programs. The CPU 31 executes programs stored in the ROM 33 and the HDD 34. The RAM 32 is used as a work area of the CPU 31.

The operation voice conversion program, the voice assistant program, and the management program may be stored in and executed by one cloud service apparatus 3a. Alternatively, part of these programs may be dispersedly stored in and executed by a plurality of cloud service apparatuses 3a such that the plurality of cloud service apparatuses 3a cooperate with each other to provide the cloud service.

Further, the management DB 340, the association DB 350, and the apparatus information DB 360 may be included in one cloud service apparatus 3a together with the operation voice conversion program, the voice assistant program, and the management program. Alternatively, these databases may be dispersedly stored in a plurality of cloud service apparatuses 3a. For example, one or all of the management DB 340, the association DB 350, and the apparatus information DB 360 may be stored in another server accessible via the network 5.

An overall functional configuration of the cloud system 3 will be described.

FIG. 5 is a diagram illustrating an overview of overall functions of the cloud system 3. FIG. 5 illustrates major functions of the cloud system 3 for providing the cloud service. Details of these major functions of the cloud system 3 and functions of the MFP 1 and the terminal 2 illustrated in FIG. 5 will be described later with reference to FIGS. 6 to 8.

The functions of the cloud system 3 are implemented by and appropriately set in one or more cloud service apparatuses 3a.

The CPU 31 of the cloud service apparatus 3a reads the operation voice conversion program stored in the HDD 34, and deploys and executes the operation voice conversion program in the RAM 32, to thereby function as an operation voice conversion unit 310. The operation voice conversion unit 310 has a function of converting audio data into text data. The operation voice conversion unit 310 further has a function of determining whether the text data matches previously defined dictionary information, and if the text data matches the dictionary information, converting the text data into an action reflecting the intention of the user and parameters representing variables of job conditions, for example.

The CPU 31 of the cloud service apparatus 3a further reads the voice assistant program stored in the HDD 34, and deploys and executes the voice assistant program in the RAM 32, to thereby function as a voice assistant unit 320. The voice assistant unit 320 has a function of holding the dictionary information.

The CPU 31 of the cloud service apparatus 3a further reads the management program stored in the HDD 34, and deploys and executes the management program in the RAM 32, to thereby function as a management unit 330. The management unit 330 has a function of converting the text data into a job execution command in a format compatible with the registered MFP 1 based on the action and the parameters, and transmitting the job execution command to the MFP 1.

In the thus-configured cloud system 3, at least the functions of the operation voice conversion unit 310, the voice assistant unit 320, and the management unit 330 implement a cloud service unit 300 that provides the cloud service.

The cloud service unit 300 stores a variety of information in databases based on communication with the MFP 1 and the terminal 2. For example, the management unit 330 manages the variety of information by using the management DB 340, the association DB 350, and the apparatus information DB 360.

The management DB 340 is a database that stores data (e.g., text data, image data, or audio data) of content of the cloud service provided by the cloud service unit 300.

The association DB 350 is a database that stores information of an information processing apparatus (i.e., an external apparatus) to be associated with the terminal 2. In the present example, in which the terminal 2 and the MFP 1 associated therewith are the smart speaker and the information processing apparatus, respectively, the association DB 350 stores a device identification (ID) of the smart speaker and an apparatus ID of the information processing apparatus in association with each other. The smart speaker and the information processing apparatus may be associated with each other on a one-to-one basis. Alternatively, the smart speaker may be associated with a plurality of information processing apparatuses. That is, the type and number of information processing apparatuses associated with one device ID are not limited. Further, the method of associating the information processing apparatus with the smart speaker is not limited to the above-describe method. That is, the information processing apparatus may be associated with information for identifying the user, such as a user account or a user ID. In this case, information identifying the smart speaker (e.g., the device ID), which is transmitted to the cloud system 3 from the smart speaker, and the information for identifying the user may be stored in the association DB 350 of the cloud system 3, for example, and the management unit 330 may identify the information processing apparatus based on the information for identifying the user associated with the device ID. Alternatively, the smart speaker may transmit to the cloud system 3 the information for identifying the user in place of the device ID. Further, the information of the information processing apparatus may be associated with information identifying an organization, such as a company or a department therein, or information identifying a place, such as a building or a room, in place of the information for identifying the user. In this case, one or more smart speakers and one or more information processing apparatuses may be associated with each other.

The apparatus information DB 360 is a database that stores the apparatus ID of each information processing apparatus such as the MFP 1 and the apparatus information of the information processing apparatus in association with each other.

Functions of the terminal 2 will be described.

Figure 6:
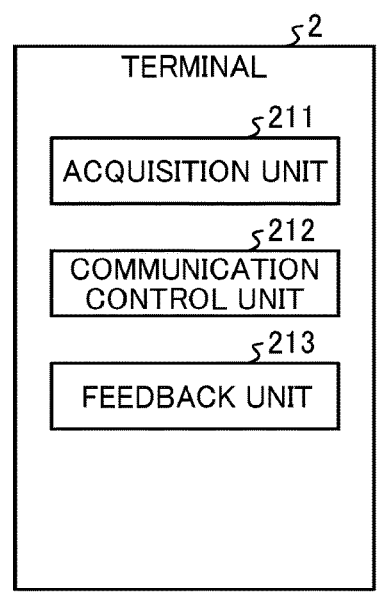
FIG. 6 is a diagram illustrating a configuration example of functional blocks of the terminal of the embodiment.

FIG. 6 is a diagram illustrating a configuration example of functional blocks of the terminal 2. The CPU 21 of the terminal 2 executes the operation processing program stored in the ROM 23, to thereby function as an acquisition unit 211, a communication control unit 212, and a feedback unit 213, as illustrated in FIG. 6.

The acquisition unit 211 acquires the voice of the user collected via the microphone 29 in FIG. 3, i.e., the instruction voice of the user for the voice operation of the MFP 1. Alternatively, the acquisition unit 211 may acquire data of the user operation via the touch panel 27 in FIG. 3 or a physical switch, for example. The communication control unit 212 controls communication with the cloud system 3. The communication control unit 212 communicates with the cloud system 3 to transmit the information acquired by the acquisition unit 211 to the cloud system 3 or acquire text data, image data, or audio data from the cloud system 3. When transmitting the information acquired by the acquisition unit 211 to the cloud system 3, the communication control unit 212 may transmit the device ID of the terminal 2 to the cloud system 3 together with the acquired information.

The feedback unit 213 outputs audio feedback to the user to prompt the user to input missing data or confirm the input, for example, to implement an interactive voice input operation. The feedback unit 213 may also control display of the touch panel 27 to output feedback to the user as text or an image.

In the present example, the acquisition unit 211, the communication control unit 212, and the feedback unit 213 are implemented by software. Alternatively, part or all of these units may be implemented by hardware such as an integrated circuit (IC). Further, the functions of these units may be implemented by the operation processing program alone. Alternatively, a part of the processing of these units may be executed by another program, or may be indirectly executed with another program.

Details of functions of the cloud service unit 300 will be described.

Figure 7:
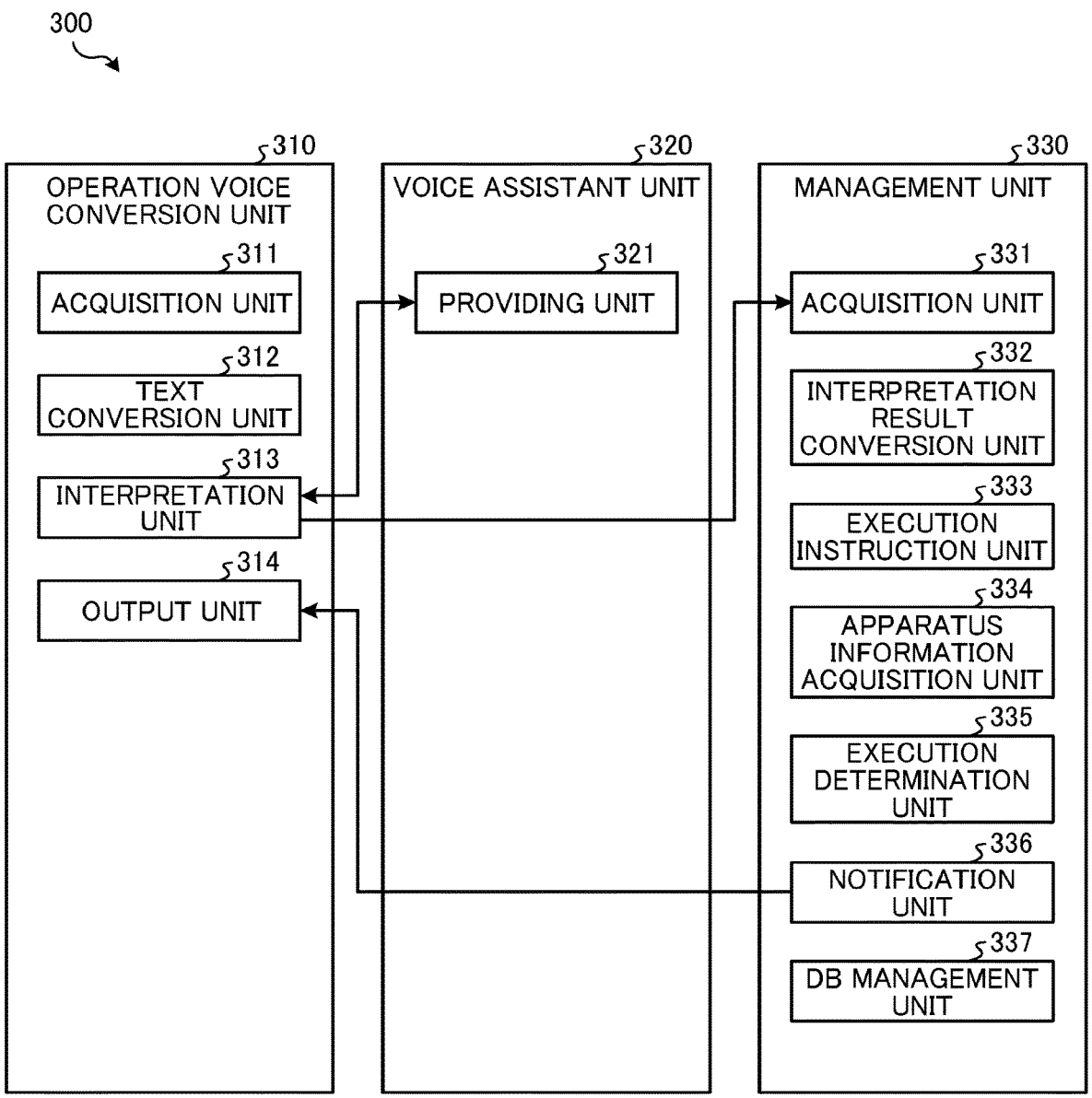
FIG. 7 is a diagram illustrating a configuration example of functions of a cloud service unit in the cloud system of the embodiment.

FIG. 7 is a diagram illustrating a configuration example of functions of the cloud service unit 300. As illustrated in FIG. 7, the operation voice conversion unit 310 includes functions such as an acquisition unit 311, a text conversion unit 312, an interpretation unit 313, and an output unit 314.

The acquisition unit 311 acquires the audio data transmitted from the terminal 2 (i.e., the audio data of the input voice of the user). The acquisition unit 311 may also acquire data representing an operation performed by the user on the touch panel 27 or a physical switch (e.g., a button) of the terminal 2. The text conversion unit 312 includes a speech-to-text (STT) function that converts audio data (i.e., the audio data of the voice of the user input to the terminal 2) into text data. The interpretation unit 313 interprets the contents of the user instruction based on the text data converted by the text conversion unit 312. Specifically, the interpretation unit 313 determines whether a word or phrase included in the text data converted by the text conversion unit 312 matches the dictionary information provided by the voice assistant unit 320. Then, if the word or phrase in the text data matches the dictionary information, the interpretation unit 313 converts the text data into the action representing the type of job and the parameters representing the variables of the job conditions, for example. The interpretation unit 313 then transmits the action and the parameters to the management unit 330 together with the device ID identifying the terminal 2 as the source of the acquired audio data, for example. The output unit 314 includes a text-tospeech (TTS) function that generates audio data from text data. The output unit 314 controls the communication of the communication device 36 in FIG. 4 to transmit data (e.g., text data, audio data, or image data) to the terminal 2.

In the present example, the acquisition unit 311, the text conversion unit 312, the interpretation unit 313, and the output unit 314 are implemented by software. Alternatively, part or all of these units may be implemented by hardware such as an IC. Further, the functions of these units may be implemented by the operation voice conversion program alone. Alternatively, a part of the processing of these units may be executed by another program, or may be indirectly executed with another program. Further, the functions of the interpretation unit 313 implemented by the operation voice conversion program may be partially or entirely executed by the voice assistant program. In this case, the voice assistant unit 320 determines whether a word or phrase included in the text data matches the dictionary information, for example. Further, if the word or phrase in the text data matches the dictionary information, the voice assistant unit 320 converts the text data into the action representing the intention of the user and the parameters representing the variables of the job conditions, for example. In this case, therefore, the interpretation unit 313 simply acquires the action and the parameters from the voice assistant unit 320.

As illustrated in FIG. 7, the voice assistant unit 320 has the function of a providing unit 321. The providing unit 321 manages the dictionary information, which previously defines the relationship between the text data, the action, and the parameters. The providing unit 321 provides the dictionary information to the operation voice conversion unit 310. The voice assistant unit 320 may receive the text data from the operation voice conversion unit 310 and interpret the operation instruction from the user based on the text data. For example, the voice assistant unit 320 may acquire the text data from the interpretation unit 313 and determine whether a word or phrase included in the text data matches the dictionary information. Then, if the word or phrase in the text data matches the dictionary information, the voice assistant unit 320 may convert the text data into an action and parameters and provide the action and the parameters to the interpretation unit 313.

In the present example, the voice assistant unit 320 including the providing unit 321 is implemented by software. Alternatively, part or all of the voice assistant unit 320 may be implemented by hardware such as an IC. Further, functions such as the providing unit 321, for example, may be implemented by the voice assistant program alone. Alternatively, a part of the processing of the functions may be executed by another program, or may be indirectly executed with another program.

As illustrated in FIG. 7, the management unit 330 includes functions such as an acquisition unit 331, an interpretation result conversion unit 332, an execution instruction unit 333, an apparatus information acquisition unit 334, an execution determination unit 335, a notification unit 336, and a DB management unit 337.

The acquisition unit 331 acquires the interpretation result from the interpretation unit 313.

The interpretation result conversion unit 332 converts the interpretation result (e.g., action and parameters) converted by the operation voice conversion unit 310 into a job execution command compatible with the MFP 1.

The execution instruction unit 333 transmits the job execution command to the MFP 1 to instruct the MFP 1 to execute the job. Specifically, the execution instruction unit 333 acquires, from the interpretation result conversion unit 332, the job execution command (e.g., action and parameters) and the device ID of the terminal 2 having received the voice instruction from the user. The execution instruction unit 333 searches through the association DB 350 in FIG. 5 for the MFP 1 corresponding to the acquired device ID, and transmits the job execution command to the MFP 1 retrieved by the search.

The apparatus information acquisition unit 334 acquires the apparatus information from each registered information processing apparatus (i.e., the MFP 1 in the present example). For example, the apparatus information acquisition unit 334 acquires information representing the processing capability of the MFP 1, such as the maximum processable pixel number of the MFP 1. The apparatus information acquisition unit 334 further acquires, as appropriate, information of the apparatus state from the MFP 1 in accordance with the settings. The information of the apparatus state includes information representing the connection state indicating whether communication connection with the MFP 1 is established, the power state of the MFP 1 such as the power-on state, the power-off state, or the sleep-mode state, the occurrence or non-occurrence of an error and the type of the error, the remaining amounts of consumables such as paper and toner, and the login state of the user, and authorization information representing functions authorized to be used by the logged-in user.

If the apparatus information such as the processing capability is acquired from a plurality of MFPs 1, the apparatus information acquisition unit 334 manages, in the apparatus information DB 360 in FIG. 5, the apparatus information of each of the MFPs 1 in association with information identifying the MFP 1 such as the apparatus ID of the MFP 1.

The execution determination unit 335 compares the processing capability of the MFP 1 with the user-specified job (i.e., the action and parameters generated by the operation voice conversion unit 310), to thereby determine whether the user-specified job is executable in the MFP 1. If it is determined that the user-specified job is executable in the MFP 1, the execution determination unit 335 transmits the job execution command to the MFP 1. If it is determined that the user-specified job is inexecutable in the MFP 1, the execution determination unit 335 may cause the notification unit 336 to feed back an error message, for example, to the terminal 2 via the operation voice conversion unit 310 as response information.

The notification unit 336 transmits data (e.g., text data, audio data, or image data) to the operation voice conversion unit 310 as a response to the job execution instruction from the user. If any of the parameters representing the job conditions for executing the job is unspecified, the notification unit 336 transmits feedback to the terminal 2 via the operation voice conversion unit 310, to thereby prompt the user to specify the unspecified parameter. In this case, the notification unit 336 may transmit parameter information as information for checking with the user about the unspecified parameter. Further, the notification unit 336 may transmit text data, audio data, or image data as information for prompting the user to specify the unspecified parameter.

The DB management unit 337 manages the management DB 340, the association DB 350, and the apparatus information DB 360. Specifically, the DB management unit 337 executes setting of various tables and registration, retrieval, deletion, and updating of data in the various tables, for example. For instance, based on information and an instruction input to the MFP 1, the terminal 2, or a client device of the cloud service apparatus 3a, the DB management unit 337 registers the device ID of the terminal 2 and the apparatus ID of the MFP 1 in association with each other in the association DB 350. The association DB 350 holds information associating the device ID of the terminal 2 with the apparatus ID of the MFP 1 in table data format, for example.

Functions of the MFP 1 will be described.

Figures 8, 9:
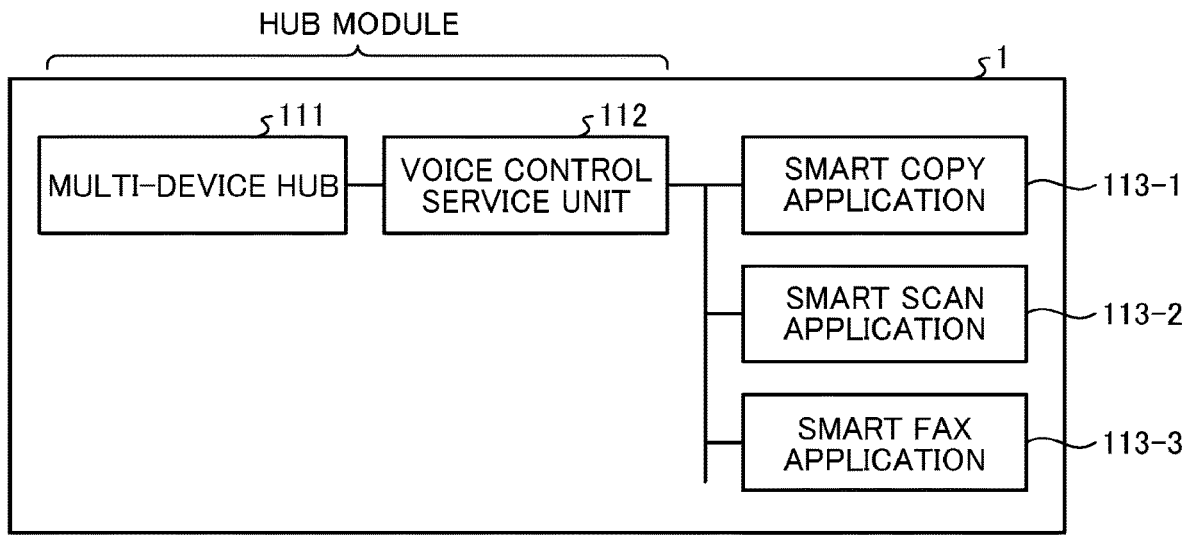
FIG. 8 is a diagram illustrating a configuration example of functional blocks of the MFP of the embodiment.
FIG. 9 is a diagram illustrating an example of entity information of the embodiment.

FIG. 8 is a diagram illustrating a configuration example of functional blocks of the MFP 1. The CPU 10 of the MFP 1 executes various programs stored in the memory 12 and the HDD 13, to thereby implement functions such as a multi-device hub 111, a voice control service unit 112, a smart copy application 113-1, a smart scan application 113-2, and a smart FAX application 113-3, for example, as illustrated in FIG. 8.

The multi-device hub 111 receives the job execution command from the cloud system 3. The multi-device hub 111 further collects information of the apparatus state and the settings of the MFP 1, and transmits information of the functions and the state of the MFP 1 to the cloud system 3. The multi-device hub 111 transmits the information of the apparatus state to the cloud system 3 periodically or when the apparatus state changes. The voice control service unit 112 receives the job execution command received by the multi-device hub 111, and executes processing based on the job execution command. The voice control service unit 112 interprets the received job execution command, and starts the target application based on the interpretation result to request the application to reflect the command in the settings or start the job.

The multi-device hub 111 and the voice control service unit 112 form a hub module, as illustrated in FIG. 8. When the state of the information processing apparatus (i.e., the MFP 1) changes infrequently, the hub module records the state of the information processing apparatus in the voice operation system 100, to thereby enable determination of whether the terminal 2 is capable of receiving an abstract request. When an application executes job settings in response to a request from the hub module, the application receives and converts the abstract request into information usable as the job settings of the information processing apparatus. Herein, the abstract request is expressed as "transmission means: electronic mail, transmission destination: logged-in user," and the information usable as the job settings of the information processing apparatus refers to the electronic mail address of the logged-in user, such as "xxxxx@yyyyymail.com," for example.

The smart copy application 113-1 is an application for executing copying. The smart scan application 113-2 is an application for executing scanning. The smart FAX application 113-3 is an application for executing FAX transmission. As well as these applications, an application for managing address information of the user and an application for transmitting data or a file to a specified address are also included in the MFP 1. Processing of each of the applications is executed in accordance with the specified command.

Each of the above-described programs may be provided as recorded on a computer-readable recording medium such as a compact disc (CD)-ROM or a flexible disk (FD) in an installable or executable file format. Further, the program may be provided as recorded on a computer-readable recording medium such as a CD-recordable (R), a digital versatile disk (DVD), a Blu-ray disc (registered trademark), or a semiconductor memory. Further, the program may be installed in the corresponding device or apparatus via a network such as the Internet, or may be previously stored in a ROM or another memory of the device or apparatus.

Setting of the dictionary information will be described.

As described above, the dictionary information is stored in the cloud system 3 (e.g., the HDD 34 of the cloud service apparatus 3*a*). The operation voice conversion unit 310 (i.e., the interpretation unit 313) of the cloud system 3 determines whether a word or phrase included in the text data converted from the audio data matches the dictionary information. If the word or phrase in the text data matches the dictionary information, the operation voice conversion unit 310 (i.e., the interpretation unit 313) generates the interpretation result including the action and the parameters defined in the dictionary information. The dictionary information may be in any format as long as it is possible to generate the action and the parameters based on the dictionary information. For example, the dictionary information includes entity information, action information, and association information. The entity information associates a parameter of a job with a natural language. It is possible to register a plurality of synonyms for one parameter. The action information represents the type of the job. The association information associates a phrase uttered by the user in the natural language with the entity information, and associates the phrase uttered by the user in the natural language with the action information. The association information enables correct interpretation even if the order of utterance of the parameter or the nuance of the parameter is somewhat changed. Further, the association information may be used to generate response text of the interpretation result based on the input data.

FIG. 9 illustrates an example of the entity information, specifically the entity information corresponding to print color. In FIG. 9, a character string "printColor" represents the entity name, and character strings on the left side such as "auto color," "monochrome," and "color" represent parameter names. Further, in FIG. 9, phrases on the right side such as "auto color," "monochrome, black and white," and "color, full color" represent synonyms.

As understood from FIG. 9, parameters and synonyms thereof are stored in association with each other as the entity information. That is, the synonyms are registered as well as the parameters. For example, therefore, when issuing an instruction to make monochrome copies, both utterances "Please make black-and-white copies" and "Please make monochrome copies" enable parameter setting.

FIG. 10 illustrates examples of user utterance phrases, action name, and entity information. In FIG. 10, the action name is included in a section under title "Action," and the entity information is included in a section under title "Entity." The remaining parts of FIG. 10 illustrate examples of the user utterance phrases. FIG. 10 illustrates a display example on a screen of the display 38 of the cloud service apparatus 3*a*. In this example, one of the user utterance phrases is dragged, as indicated by the arrow in FIG. 10, through the operation of the operation device 39. This drag operation may be performed on a display screen of a personal computer (PC) of an administrator accessing the cloud system 3 via the network 5.

For example, the entity information to be associated with the corresponding information is selected through the above-described operation. Further, if the value is set in the selected entity information, the parameter included in the response is changed. For example, if the value is set as "SprintColor" for the utterance "Please make black-and-white copies," "printColor=monochrome" is returned as the return value. If the value is set as "SprintColor.original," "printColor=black and white" is returned as the return value, and the same contents as those of the user utterance are returned as the parameter in the response.

An overall procedure of the voice input operation of the voice operation system 100 will be described.

Figure 11:
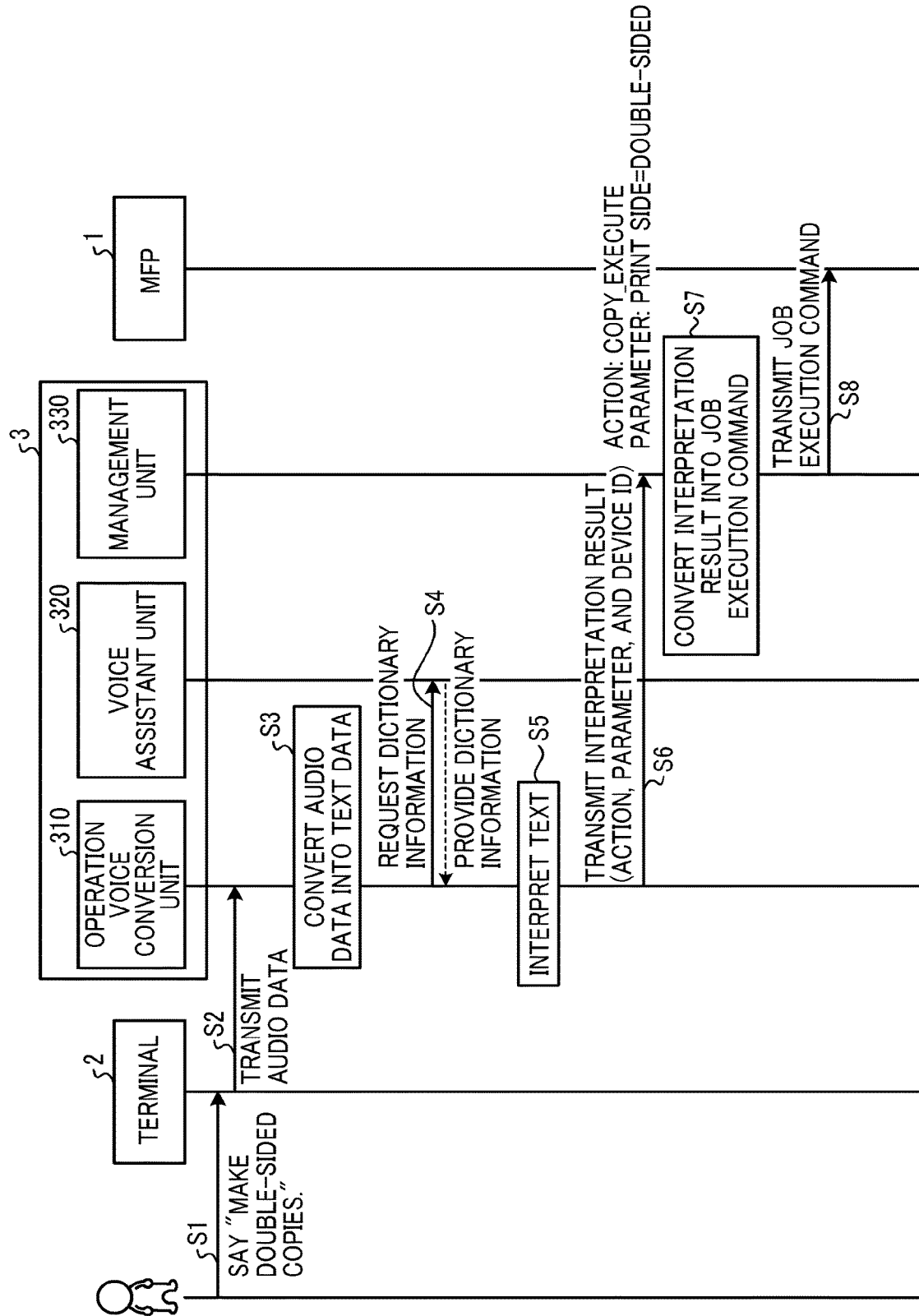
FIG. 11 is a sequence diagram illustrating an example of a basic overall operation of the voice operation system of the embodiment to perform a voice input operation.

FIG. 11 is a sequence diagram illustrating an example of a basic overall procedure of the voice input operation performed in the voice operation system 100. FIG. 11 illustrates an exemplary operation performed when the MFP 1 has a duplex copy function and the user issues an instruction to the MFP 1 to execute duplex copying through the voice input operation via the terminal 2. In this case, the operation processing program of the terminal 2 may be started at the same time as the start-up of the terminal 2. Alternatively, the operation processing program may be started when a predetermined operation is performed on the terminal 2 or when predetermined sound is input to the terminal 2.

The user first utters a word or phrase to the terminal 2 to issue an instruction to the MFP 1. In the present example, the user utters a phrase "Make double-sided copies," for instance. The voice of the user is acquired as audio data by the terminal 2 (i.e., the acquisition unit 211) (step S1). The terminal 2 (i.e., the communication control unit 212) transmits the audio data of the utterance "Make double-sided copies" to the cloud system 3 (step S2). In this step, the terminal 2 (i.e., the communication control unit 212) may also transmit the device ID of the terminal 2 to the cloud system 3.

In the cloud system 3, the operation voice conversion unit 310 (i.e., the acquisition unit 311) acquires the data transmitted from the terminal 2. Then, the operation voice conversion unit 310 (i.e., the text conversion unit 312) converts the audio data of the utterance "Make double-sided copies" into text data, i.e., performs a text data conversion process (step S3).

Then, in the present example, the operation voice conversion unit 310 (i.e., the interpretation unit 313) requests the voice assistant unit 320 (i.e., the providing unit 321) to transmit the dictionary information, and acquires the dictionary information from the voice assistant unit 320 (i.e., the providing unit 321) (step S4).

Further, the operation voice conversion unit 310 (i.e., the interpretation unit 313) interprets the text data based on the acquired dictionary information (step S5). In the present example, the text data includes the phrase "Make double-sided copies." Thus, the operation voice conversion unit 310 (i.e., the interpretation unit 313) interprets that the type (i.e., action) of the job is an action requesting the MFP 1 to execute copying (i.e., ACTION: COPY_EXECUTE). Further, the contents (i.e., parameters) of the action include "double-sided." Thus, the operation voice conversion unit 310 (i.e., the interpretation unit 313) interprets that the print side is double-sided (i.e., PARAMETER: PRINT SIDE=DOUBLE-SIDED). The operation voice conversion unit 310 (i.e., the interpretation unit 313) thus interprets, based on the text data, the type (i.e., action) and the contents (i.e., parameters) of the job specified by the user.

The operation voice conversion unit 310 (i.e., the interpretation unit 313) transmits the interpretation result to the management unit 330 (step S6). In this step, the operation voice conversion unit 310 (i.e., the interpretation unit 313) may transmit the device ID of the terminal 2 (i.e., the source of the transmitted audio data) to the management unit 330 in association with the interpretation result.

The management unit 330 (i.e., the interpretation result conversion unit 332) converts the interpretation result acquired from the operation voice conversion unit 310 into a job execution command to the MFP 1 (step S7). TABLE 1 given below illustrates examples of the interpretation result and the job execution command converted from the interpretation result. Information as in TABLE 1 may be stored in a memory such as the HDD 34 of the cloud service apparatus 3a such that the management unit 330 (i.e., the interpretation result conversion unit 332) refers to the stored information to convert the interpretation result into the job execution command.

TABLE 1

| Name | Value | Processing of application |
|---|---|---|
| Action | COPY_EXECUTE | Execute copy job |
| | SCAN_EXECUTE | Execute scan job |
| | PRINT_EXECUTE | Execute print job |
| | FAX_EXECUTE | Execute FAX job |
| Parameter | PRINT SIDE | Change setting value of print side |
| | QUANTITY | Change setting value of quantity |
| | *Other parameters specifiable as job setting values | |

In the examples of TABLE 1, "COPY_EXECUTE," "SCAN_EXECUTE," "PRINT_EXECUTE," and "FAX_EXECUTE" are given as examples of the action, and "PRINT SIDE" and "QUANTITY" are given as examples of the parameter. Examples of the parameter include all other parameters specifiable as job setting values.

The management unit 330 (i.e., the interpretation result conversion unit 332) converts the interpretation result of the action "COPY_EXECUTE" into a job execution command to the MFP 1 to execute the copy job. The management unit 330 (i.e., the interpretation result conversion unit 332) similarly converts the interpretation result of the action "SCAN_EXECUTE" into a job execution command to the MFP 1 to execute the scan job, converts the interpretation result of the action "PRINT_EXECUTE" into a job execution command to the MFP 1 to execute the print job, and converts the interpretation result of the action "FAX_EXECUTE" into a job execution command to the MFP 1 to execute the FAX job.

The above-described jobs are basic jobs executed by the MFP 1. However, the jobs interpretable by the cloud service unit 300 are not limited to the above-described jobs, and may include, for example, a job of causing a communication target (e.g., the MFP 1) to collect and transmit the apparatus information thereof to the cloud service unit 300 and a job of causing a display of the communication target to display predetermined information stored in a memory of the communication target.

Further, if the interpretation result includes the parameter "print side," the management unit 330 (i.e., the interpretation result conversion unit 332) converts the interpretation result into a job execution command to the MFP 1 to change the setting value of the print side. Similarly, if the interpretation result includes the parameter "quantity," the management unit 330 (i.e., the interpretation result conversion unit 332) converts the interpretation result into a job execution command to the MFP 1 to change the setting value of the quantity.

That is, the management unit 330 (i.e., the interpretation result conversion unit 332) converts the interpretation result into the job execution command by determining the intention of the user, such as the type of job to be executed by the MFP 1, for example, based on the information included in the action of the interpretation result, and determining the value included in the parameter of the interpretation result as the job setting value.

The management unit 330 (i.e., the execution instruction unit 333) transmits the thus-obtained job execution command to the MFP 1 (step S8). In the present example, a job execution command "COPY_EXECUTE (PRINT SIDE=DOUBLE-SIDED)" is transmitted to the MFP 1. The management unit 330 (i.e., the execution instruction unit 333) transmits the job execution command to the MFP 1 identified by the DB management unit 337, i.e., transmits an instruction to execute the job to the MFP 1 corresponding to the apparatus ID associated with the device ID of the terminal 2 as the source of the transmitted audio data. Thereby, duplex copying is executed in the MFP 1 corresponding to the terminal 2 implemented as the smart speaker.

Feedback in an interactive operation will be described

The voice operation system 100 of the embodiment implements an interactive system that responds to user input. For example, the voice operation system 100 of the embodiment implements an interactive system by outputting two types of responses: input lack feedback and input confirmation feedback, as well as responses with fixed sentences for interaction, to respond to the operation of the MFP 1.

The input lack feedback is a response output when the information for use in executing the job is incomplete. The input lack feedback is output when the result of user input is not recognized or when a necessary parameter is missing (i.e., unspecified). That is, it is unnecessary to output the input lack feedback when a parameter other than the necessary parameter is unspecified. The input lack feedback may be applied not only to the process of checking with the user about the parameter but also to the process of checking with the user about the function to be used, such as the copy function or the scan function.

The cloud system 3 may check necessary settings depending on the type of the information processing apparatus (i.e., the MFP 1 in the present example) currently in communication with the cloud system 3, and may set the parameters of the information processing apparatus. For example, the management unit 330 (i.e., the apparatus information acquisition unit 334) of the cloud system 3 may acquire the apparatus information representing the type and functions of the information processing apparatus at a predetermined time after the communication with the information processing apparatus is established, and the operation voice conversion unit 310 (the output unit 314) may receive and output the apparatus information to the terminal 2 (i.e., the smart speaker). With the feedback unit 213, the terminal 2 is capable of checking with the user about the settings. Further, the feedback unit 213 may determine the parameters, for example. Specifically, in the case of the MFP 1 of the present example, the terminal 2 may check with the user about the functions of the MFP 1, such as the copy function, the print function, the scan function, and the FAX function. Further, the terminal 2 may check with the user about which one of the functions of the MFP 1, such as the copy function, the print function, the scan function, and the FAX function, is to be used. Further, the necessary parameter may be changed in accordance with the setting condition specified by the user. For example, if the setting condition specified by the user is variable magnification printing, the print sheet size is set as the necessary parameter. Further, if the setting condition specified by the user is duplex printing, the setting of whether to print one side or two sides of the document is set as the necessary parameter. Further, if the setting condition specified by the user is bookbind printing, settings such as the finished size and the number of pages to be included in one page are set as the necessary parameters.

The input confirmation feedback is a response output when the information for use in executing the job is complete. For example, the input confirmation feedback is output when all necessary parameters are specified by the user. Further, the input confirmation feedback may be output to prompt the user to select between executing the job with the current setting values and changing the setting values. To check with the user whether to execute the job with the current setting values, each of the parameters specified by the user may be output as sound regardless of whether the parameter is a necessary parameter or not.

Information about which one of the parameters is a necessary parameter is previously stored in the cloud system 3 (i.e., a memory of the cloud service apparatus 3a, such as the HDD 34, for example). The necessary parameters stored in the memory (e.g., the HDD 34) may be changed as appropriate with the operation device 39 of the cloud service apparatus 3a or a PC accessible to the cloud service apparatus 3a via the network 5, for example. Based on the necessary parameters stored in the memory (e.g., the HDD 34), the management unit 330 (i.e., the execution determination unit 335) determines whether the action and the parameters transmitted from the operation voice conversion unit 310 meet the necessary parameters.

A procedure of the interactive operation will be described.

Figure 12:
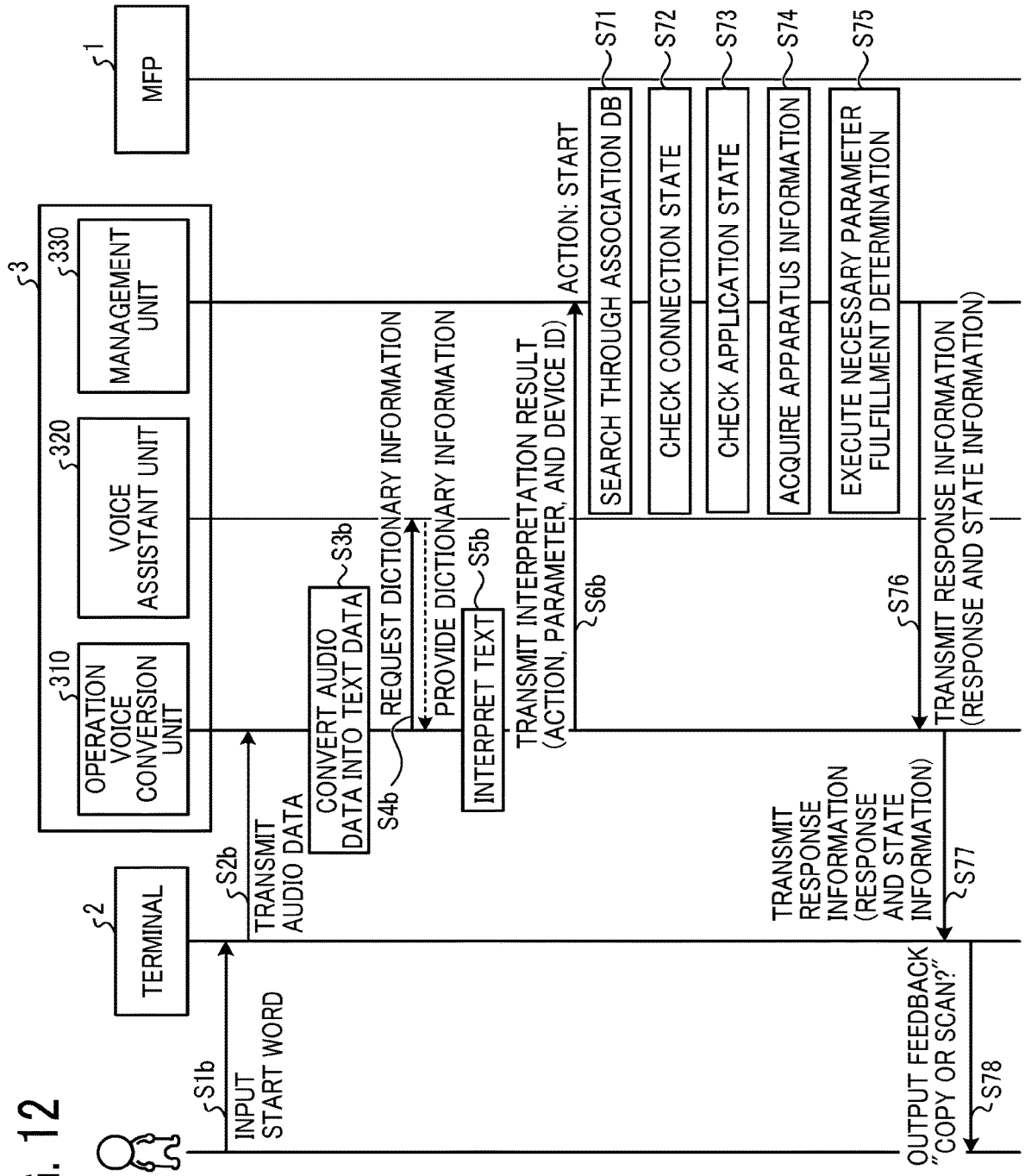
FIG. 12 is a sequence diagram illustrating an example of an operation of the voice operation system of the embodiment to start a voice assistant program to operate the MFP through user interaction with the voice operation system.
Figure 13:
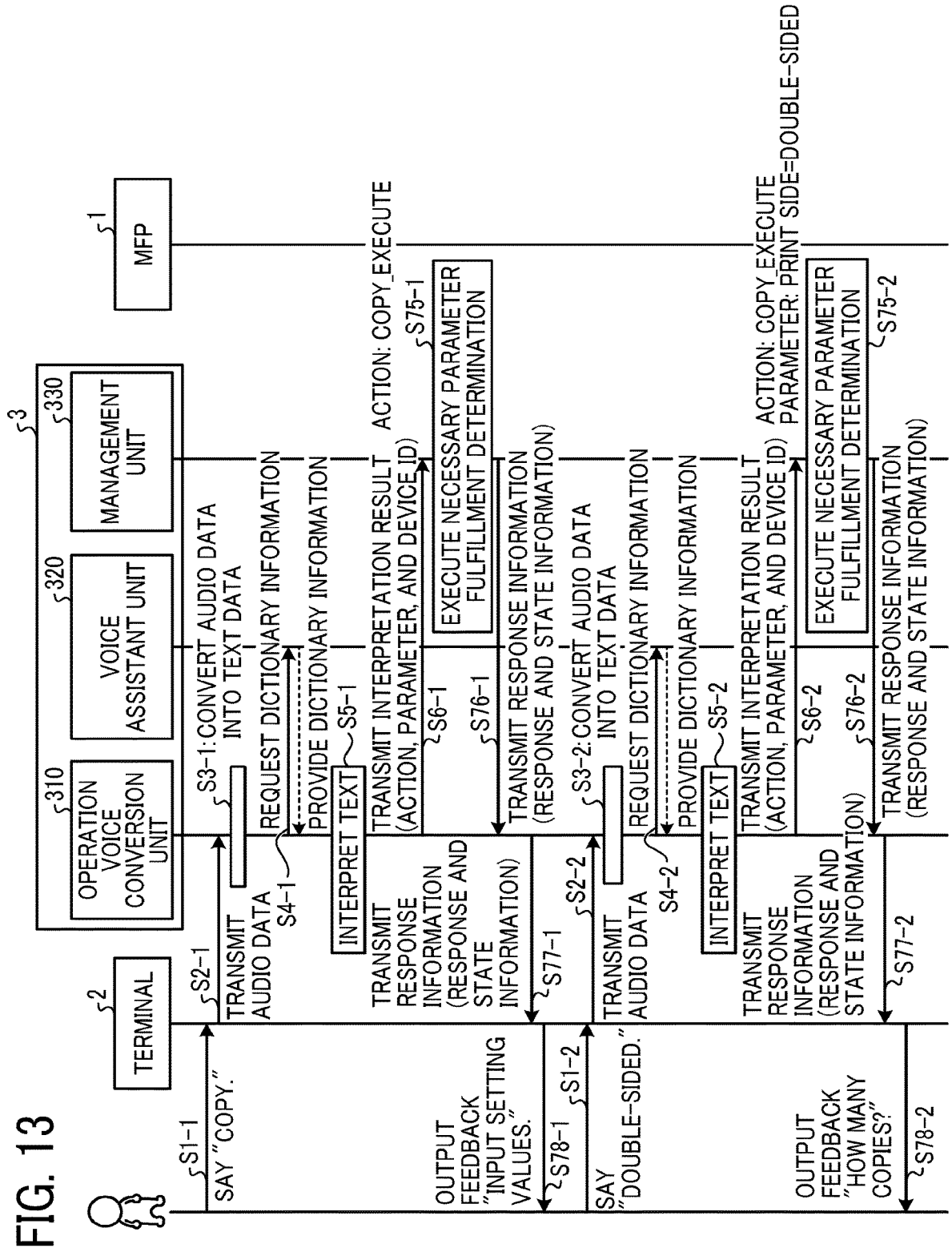
FIGS. 13 to 15 are sequence diagrams illustrating an example of an interactive operation of the voice operation system of the embodiment performed after the start-up of the voice assistant program to operate the MFP through the user interaction with the voice operation system.
Figure 14:
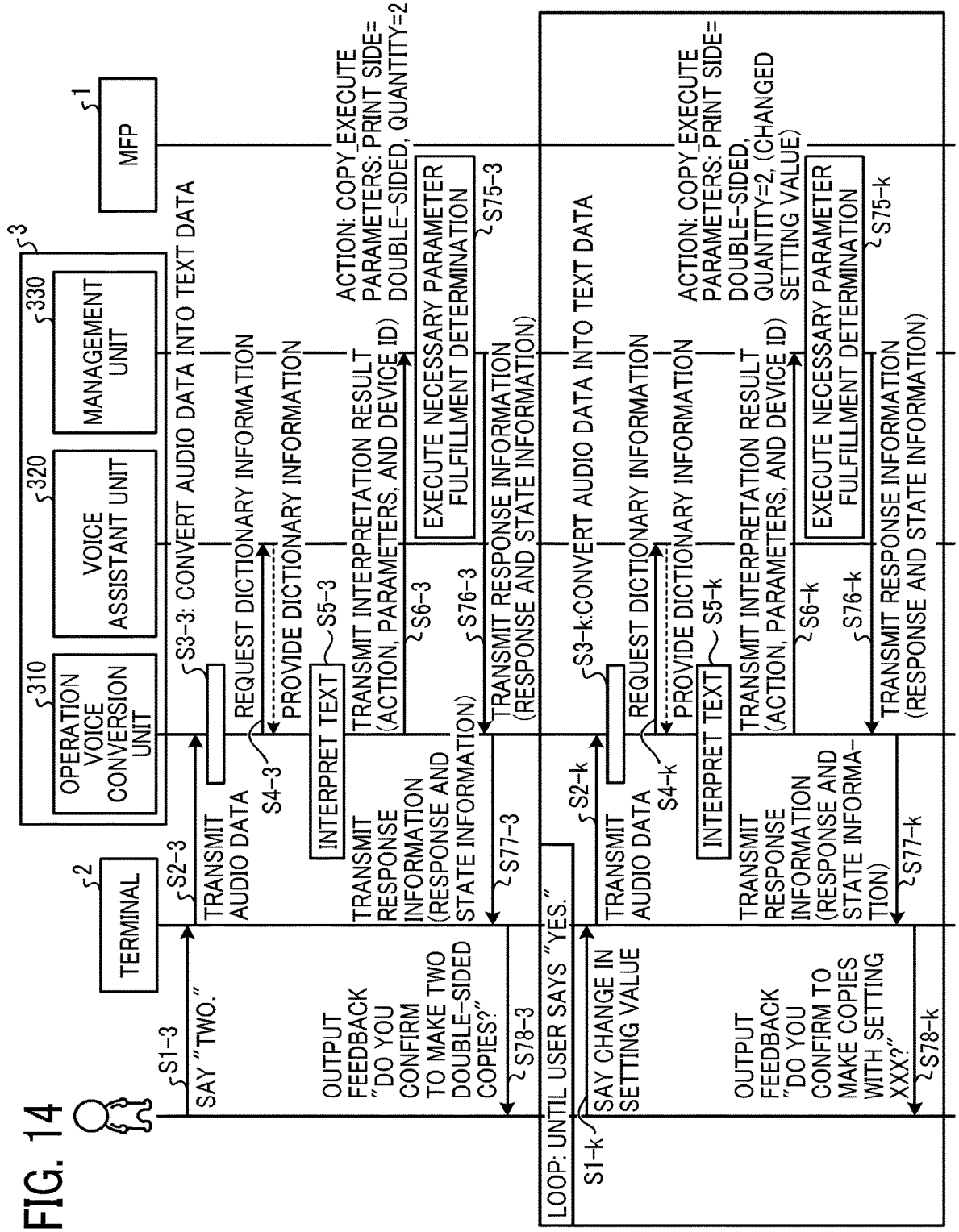
Figure 15:
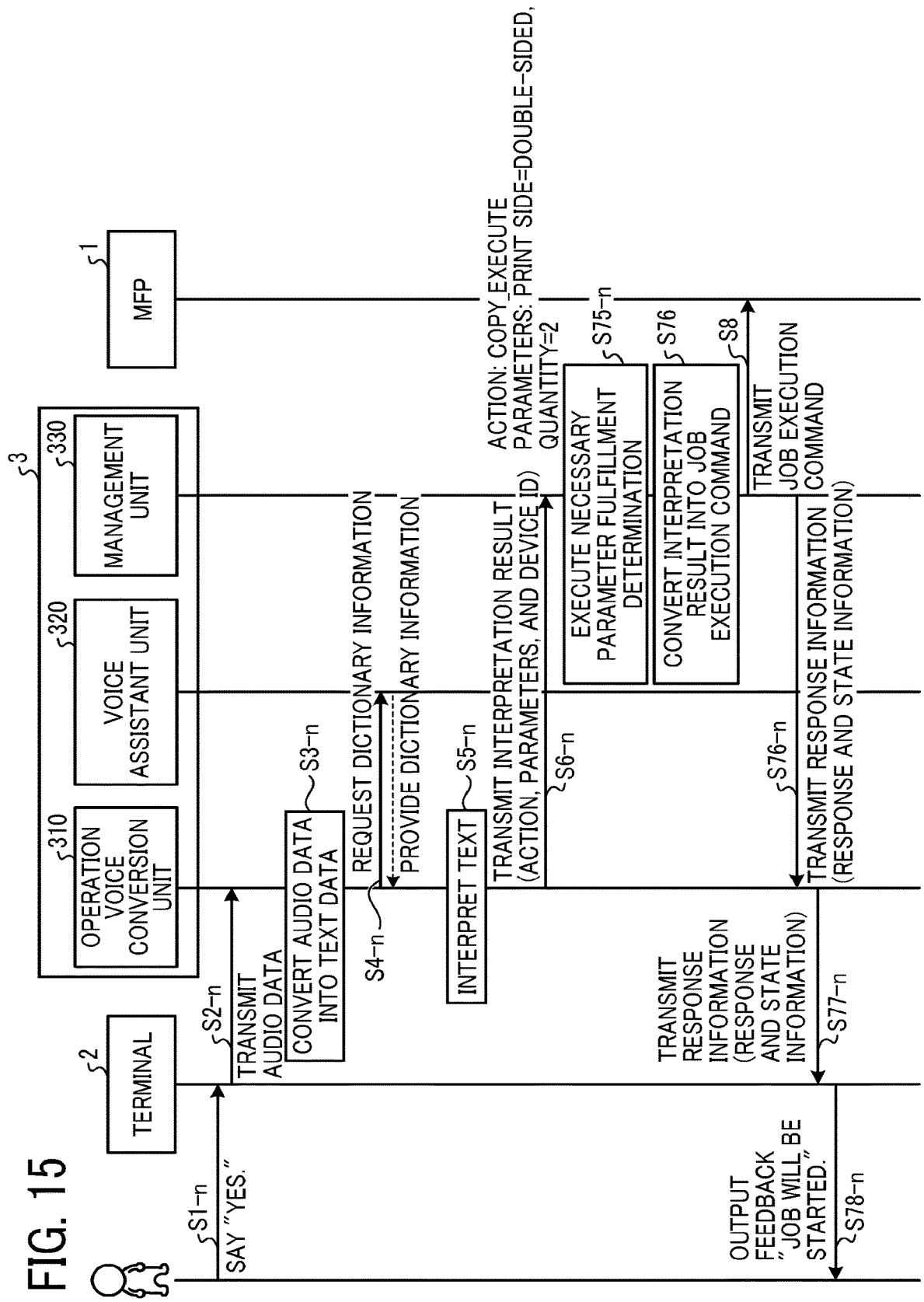

FIGS. 12 to 15 are sequence diagrams illustrating an example of an overall procedure of an operation performed in the voice operation system 100 to operate the MFP 1 based on interaction between the user and the voice operation system 100. FIG. 12 illustrates a procedure of an operation performed to start the voice assistant program. FIGS. 13 to 15 illustrate a procedure of an interactive operation performed after the voice assistant program is started.

The operation of the MFP 1 based on the interaction between the user and the voice operation system 100 involves the management of the interaction session, which will be described later. The following description will be given of an example in which an instruction to execute an operation of making two double-sided monochrome copies is issued by the user via the terminal 2. In this example, the quantity (i.e., two) is a necessary parameter. However, the necessary parameter is not limited to the quantity, and a plurality of parameters such as monochrome, color, and sheet size may be set as necessary parameters.

The user first performs an operation of starting the operation processing program of the terminal 2, and performs voice input by uttering a start word to the terminal 2, for example (step S1b). In this step, the user utters a start word for starting the voice assistant program, to thereby start the voice assistant program. The terminal 2 (i.e., the communication control unit 212) transmits audio data of the start word to the cloud system 3 (i.e., the operation voice conversion unit 310) (step S2b).

In the cloud system 3, the operation voice conversion unit 310 (i.e., the acquisition unit 311) acquires the data transmitted from the terminal 2. Then, the operation voice conversion unit 310 (i.e., the text conversion unit 312) converts the audio data into text data, i.e., performs the text data conversion process (step S3b).

The operation voice conversion unit 310 (i.e., the interpretation unit 313) requests the voice assistant unit 320 (i.e., the providing unit 321) to transmit the dictionary information, and acquires the dictionary information from the voice assistant unit 320 (i.e., the providing unit 321) (step S4b).

The operation voice conversion unit 310 (i.e., the interpretation unit 313) further interprets the text data based on the acquired dictionary information (step S5b).

The operation voice conversion unit 310 (i.e., the interpretation unit 313) then transmits the interpretation result to the management unit 330 (step S6b).

Then, the management unit 330 executes, as necessary, processes such as search through the association DB 350 (step S71), check of the connection state (step S72), check of the application state (step S73), and acquisition of the apparatus information (step S74). The order of these processes may be changed as appropriate. Further, if any of these processes is performed at a different time, the process may be omitted here.

In the search through the association DB 350 (step S71), the management unit 330 (i.e., the DB management unit 337) searches through the association DB 350 to acquire the apparatus ID of the MFP 1 corresponding to the acquired device ID of the terminal 2. If the apparatus ID of the MFP 1 associated with the device ID fails to be retrieved in this search, the management unit 330 (i.e., the notification unit 336) notifies the user, via the operation voice conversion unit 310 (i.e., the output unit 314), that the terminal 2 is not associated with the communication target (i.e., the MFP 1). For example, the management unit 330 (i.e., the notification unit 336) generates response information including a response "This device is not associated with the apparatus." In this case, the management unit 330 (i.e., the notification unit 336) may include, in the response, guidance on how to associate the device with the communication target. The process of step S71 may be executed at another time when the device ID of the terminal 2 is acquired.

In the check of the connection state (step S72), the management unit 330 checks the apparatus state of the communication target (i.e., the MFP 1 in the present example). For example, the DB management unit 337 refers to the previously acquired apparatus information stored in the apparatus information DB 360, or the apparatus information acquisition unit 334 acquires the apparatus information from the MFP 1 as the communication target. The check of the apparatus state is performed to determine whether it is possible to communicate with the MFP 1 as the communication target and whether the MFP 1 is available, for example. If the connection with the MFP 1 associated with the device ID (i.e., the MFP to be checked) is not established, or if the MFP 1 is being started up and thus is unavailable, for example, the management unit 330 (i.e., the notification unit 336) notifies the user of unavailability of the MFP 1 via the operation voice conversion unit 310 (i.e., the output unit 314). For example, the management unit 330 (i.e., the notification unit 336) generates response information including a response "The apparatus is off-line" or "The apparatus is setting up," and notifies the user of the response information. In this case, the management unit 330 (i.e., the notification unit 336) may include, in the response, guidance on how to respond to the situation. The check of the apparatus state may be executed at another time when the action, the parameters, and the device ID are acquired from the operation voice conversion unit 310 (i.e., the interpretation unit 313).

In the check of the application state (step S73), the management unit 330 checks with the MFP 1 (i.e., the communication target) about the state of the application that executes the function specified by the user. For example, the DB management unit 337 refers to the previously acquired apparatus information stored in the apparatus information DB 360, or the apparatus information acquisition unit 334 acquires the apparatus information from the MFP 1 as the communication target. The check of the application state is performed to determine whether the application is installed in the MFP 1 and whether the application is in an executable state, for example.

If the user specifies the execution of the copy function, and if the application for the copy function is not installed in the MFP 1 associated with the device ID of the terminal 2 or is being started up and thus is unavailable, for example, the management unit 330 (i.e., the notification unit 336) notifies the user of unavailability of the application via the operation voice conversion unit 310 (i.e., the output unit 314). For example, the management unit 330 (i.e., the notification unit 336) generates response information including a response "The application is not installed" or "The application is unavailable now," and notifies the user of the response information. In this case, the management unit 330 (i.e., the notification unit 336) may include, in the response, guidance on how to respond to the situation. The check of the application state may be executed at another time when the action, the parameters, and the device ID are acquired from the operation voice conversion unit 310 (the interpretation unit 313).

In the acquisition of the apparatus information (step S74), the management unit 330 acquires the apparatus information of the communication target (i.e., the MFP 1 in the present example). For example, the DB management unit 337 acquires the previously acquired apparatus information stored in the apparatus information DB 360. Alternatively, the apparatus information acquisition unit 334 may acquire the apparatus information from the MFP 1 as the communication target. The apparatus state acquired in this step is used to determine whether the MFP 1 as the communication target is capable of executing the job with the job type and the job conditions specified by the user, for example.

If the above-described processes are completed after the start-up operation, the management unit 330 (i.e., the execution determination unit 335) executes necessary parameter fulfillment determination (step S75). In the necessary parameter fulfillment determination, the management unit 330 (i.e., the execution determination unit 335) determines, based on the action and the parameters of the interpretation result, whether all conditions for the job execution are met.

If the job type and the necessary job setting conditions are all specified when the instruction to start the voice assistant program is issued, the job execution command may be transmitted to the MFP 1 with omission of the following steps of the input lack feedback.

At this stage, the instruction to start the voice assistant program has been issued in voice, but a plurality of actions and parameters of the MFP 1 are not specified by the user. Therefore, the management unit 330 (i.e., the execution determination unit 335) determines that the necessary parameters are not met. If any of the necessary conditions is unspecified when the instruction to start the voice assistant program is issued, the management unit 330 (i.e., the execution determination unit 335) similarly determines that the necessary parameters are not met. Therefore, the management unit 330 (i.e., the notification unit 336) generates response information, and transmits the response information to the terminal 2 via the operation voice conversion unit 310 (i.e., the output unit 314) (steps S76 and S77).

The management unit 330 (i.e., the DB management unit 337) manages the communication session with the terminal 2 in the management DB 340. When transmitting the response information to the terminal 2, the management unit 330 (i.e., the notification unit 336) also transmits state information to the terminal 2. Herein, the state information is information indicating that the session is ongoing. When the cloud system 3 transmits an inquiry to the terminal 2 in a subsequent step, the cloud system 3 similarly transmits the state information to the terminal 2 together with the inquiry, although description thereof will be omitted as appropriate.

The response information may include text data, audio data, or image data of the inquiry to the user. In the present example, audio data of an inquiry "Copy or scan?" is transmitted, for example. Thereby, the terminal 2 (i.e., the feedback unit 213) outputs audio feedback with the message "Copy or scan?" (step S78).

The feedback is not limited the above-described message, and may be any message prompting the user to input (i.e., specify) the job type or the job setting condition. Further, the feedback to the user is not limited to the audio output, and may be displayed as text or an image on the touch panel 27 of the terminal 2. In this case, data such as text data or image data (i.e., display information) is transmitted to the terminal 2.

If the user utters a word "Copy" after step S78 or when issuing the instruction to start the voice assistant program, the voice of the user is acquired as audio data by the terminal 2 (i.e., the acquisition unit 211) (step S1-1). The terminal 2 (i.e., the communication control unit 212) transmits the audio data of the utterance "Copy" to the cloud system 3 (step S2-1). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-1 to S5-1), and transmits the interpretation result to the management unit 330 (step S6-1). In this step, the action "COPY_EXECUTE" corresponding to the utterance "Copy" is transmitted to the management unit 330 as the interpretation result.

Then, the management unit 330 (i.e., the execution determination unit 335) again executes the necessary parameter fulfillment determination (step S75-1). In the present example, the user has uttered the word "Copy," but the setting values of the necessary parameters such as the number of copies are unknown.

The cloud system 3 therefore inquires of the terminal 2 about the unspecified parameters. Specifically, since the setting values are unspecified at this stage, the management unit 330 (i.e., the notification unit 336) generates response information including a response "Input setting values," and transmits audio data of the response "Input setting values" to the terminal 2 via the operation voice conversion unit 310 (i.e., the output unit 314) (steps S75-1 to S77-1). Then, the terminal 2 (i.e., the feedback unit 213) outputs sound "Input setting values" (step S78-1). In this case, too, the terminal 2 (i.e., the feedback unit 213) may display text "Input setting values" on the touch panel 27, for example, as well as outputting the audio feedback.

Then, in response to the input lack feedback, the user utters a phrase "Double-sided," for example, and the voice of the user is acquired as audio data by the terminal 2 (i.e., the acquisition unit 211) (step S1-2). The terminal 2 (i.e., the communication control unit 212) transmits the audio data of the utterance "Double-sided" to the cloud system 3 (step S2-2). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-2 to S5-2), and transmits the interpretation result to the management unit 330 (step S6-2).

In this step, the operation voice conversion unit 310 (i.e., the interpretation unit 313) generates the parameter "PRINT SIDE=DOUBLE-SIDED" as the interpretation result, and transmits the interpretation result to the management unit 330.

Then, the management unit 330 (i.e., the execution determination unit 335) again executes the necessary parameter fulfillment determination (step S75-2). Specifically, the management unit 330 (i.e., the DB management unit 337) stores the interpretation result of the last utterance in the management DB 340, for example, and combines the interpretation result of the last utterance and the interpretation result of the current utterance to complete the action and the parameter. The management unit 330 (i.e., the execution determination unit 335) again executes the necessary parameter fulfillment determination based on the combined interpretation results.

In the above-described example, the management unit 330 combines the interpretation result of the last utterance and the interpretation result of the current utterance. However, the configuration is not limited thereto. For example, the operation voice conversion unit 310 may transmit, to the management unit 330, an interpretation result combining the action "COPY_EXECUTE" in the last utterance and the parameter "PRINT SIDE=DOUBLE-SIDED" in the current utterance.

In the present example, the user has uttered the phrases "Copy" and "Double-sided," but another necessary parameter such as the number of copies is unknown. The management unit 330 (i.e., the execution determination unit 335) therefore determines the lack of a necessary parameter at this stage, too (step S75-2).

The cloud system 3 therefore inquires of the terminal 2 about the unspecified parameter. Steps of inquiring of the terminal 2 about the unspecified parameter are similar to the above-described steps. That is, the management unit 330 (i.e., the notification unit 336) generates response information including a response "How many copies?" and transmits audio data of the response "How many copies?" to the terminal 2 via the operation voice conversion unit 310 (i.e., the output unit 314) (steps S75-2 to S77-2). Then, the terminal 2 (i.e., the feedback unit 213) outputs sound "How many copies?" (step S78-2). In this case, too, the terminal 2 (i.e., the feedback unit 213) may display text "How many copies?" on the touch panel 27, for example, as well as outputting the audio feedback.

Then, in response to the input lack feedback, the user utters a word "Two," for example. Thereafter, similarly as in the foregoing steps, audio data of the utterance is transmitted from the terminal 2 to the cloud system 3, and the necessary parameter fulfillment determination is executed in the cloud system 3. That is, the voice of the user is acquired as audio data by the terminal 2 (i.e., the acquisition unit 211) (step S1-3). The terminal 2 (i.e., the communication control unit 212) transmits the audio data of the utterance "Two" to the cloud system 3 (step S2-3). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data.

Thereafter, similarly as in steps S3*b* to S5*b*, the operation voice conversion unit 310 executes the processes to the interpretation of the text data (steps S3-3 to S5-3), and transmits the interpretation result to the management unit 330 (step S6-3).

In the present example, the operation voice conversion unit 310 (i.e., the interpretation unit 313) generates the parameter "QUANTITY=2" as the interpretation result, and transmits the interpretation result to the management unit 330.

Then, the management unit 330 (i.e., the execution determination unit 335) again executes the necessary parameter fulfillment determination (step S75-3). Specifically, the management unit 330 (i.e., the DB management unit 337) combines the interpretation result of the last utterance and the interpretation result of the current utterance to complete the action and the parameters. That is, in the present example, the management unit 330 (i.e., the DB management unit 337) completes the action "COPY_EXECUTE" and the parameters "PRINT SIDE=DOUBLE-SIDED, QUANTITY=2." The management unit 330 (i.e., the execution determination unit 335) again executes the necessary parameter fulfillment determination based on the combined interpretation results. In the present example, with the user utterance "Two," the unspecified necessary parameter of the copy job is specified.

In the present example, the management unit 330 (i.e., the notification unit 336) then generates response information including a response "Do you confirm to make two double-sided copies?" for the input confirmation feedback, and transmits audio data of the response "Do you confirm to make two double-sided copies?" to the terminal 2 via the operation voice conversion unit 310 (i.e., the output unit 314) (steps S75-3 to S77-3). Then, the terminal 2 (i.e., the feedback unit 213) outputs sound "Do you confirm to make two double-sided copies?" (step S78-3). In this case, too, the terminal 2 (i.e., the feedback unit 213) may display text "Do you confirm to make two double-sided copies?" on the touch panel 27, for example, as well as outputting the audio feedback. In this step, instead of outputting the text data or the audio data included in the response information, the terminal 2 may generate output information by combining text data items stored in a memory of the terminal 2 based on information included in the response information.

Then, in response to the input confirmation feedback, the user utters an instruction to the terminal 2 to change a setting value or start copying. If the user utters the instruction to change the setting value (step S1-*k*), audio data of the uttered instruction to change the setting value is transmitted to the cloud system 3 from the terminal 2 (step S2-*k*). Then, the cloud system 3 changes the setting value, and transmits audio feedback to the terminal 2 to notify that the setting value has been changed (steps S3-*k* to S77-*k*). Then, the terminal 2 outputs audio feedback with a message such as "Do you confirm to make copies with setting XXX?" for example, to check with the user whether to start copying with the changed setting value (step S78-*k*).

Thereafter, if the user again utters the instruction to change the setting value, the above-described sequence is repeated. After the output of the audio feedback "Do you confirm to make two double-sided copies?" therefore, this sequence is repeated k times, i.e., the number of times by which the user utters the instruction to change the setting value.

If the user utters the instruction to start copying with a response "Yes," for example, the n-th sequence illustrated in FIG. 15 takes place. That is, the voice of the user is acquired as audio data by the terminal 2 (i.e., the acquisition unit 211) (step S1-*n*). The terminal 2 (i.e., the communication control unit 212) transmits the audio data of the utterance "Yes" to the cloud system 3 (step S2-*n*). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3*b* to S5*b*, the operation voice conversion unit 310 executes the processes to the interpretation of the text data (steps S3-*n* to S5-*n*), and transmits the interpretation result to the management unit 330 (step S6-*n*).

In this step, the operation voice conversion unit 310 (i.e., the interpretation unit 313) recognizes the copy start instruction and transmits the interpretation result to the management unit 330. Then, the management unit 330 (i.e., the execution determination unit 335) determines that the necessary parameters are specified (step S75-*n*).

Thereby, the management unit 330 (i.e., the interpretation result conversion unit 332) converts the interpretation result into a job execution command to the MFP 1 (step S76). The management unit 330 (i.e., the execution instruction unit 333) then transmits the job execution command obtained through the conversion process to the MFP 1 (step S8). With the voice input operation, therefore, the MFP 1 is controlled to execute copying. The management unit 330 (i.e., the notification unit 336) then generates response information, and transmits the response information to the terminal 2 via the operation voice conversion unit 310 (i.e., the output unit 314) (steps S76-*n* and S77-*n*). Then, based on the response information, the terminal 2 outputs audio feedback "Job will be started" (step S78-*n*).

The above-described state information represents the state of the session. For example, if the job execution command to the MFP 1 is not transmitted yet and the user is performing the job setting process, state information indicating the continuation of the session is transmitted. If the transmission of the job execution command to the MFP 1 is completed, state information indicating the completion of the session is transmitted.

However, the state information is not limited thereto, and may be more detailed information of the session state. The operation voice conversion unit 310 or the management unit 330 determines whether to continue or complete the session in accordance with the state information. That is, if the user specifies the job setting conditions with a plurality of utterances, and if the state information indicates that the session is ongoing, the operation voice conversion unit 310 or the management unit 330 determines that the job setting conditions belong to one job. If the state information indicates that the session is completed, the operation voice conversion unit 310 or the management unit 330 determines that the job setting condition included in the next user utterance belongs to a new job. Even if the instruction concerning the job type and the job setting conditions is issued with a plurality of utterances, therefore, the operation voice conversion unit 310 or the management unit 330 is capable of determining whether the job type and the job setting conditions belong to the same job or different jobs.

If no signal is received from the terminal 2 for at least a predetermined time, the management unit 330 may determine that the session is completed. The communication target (i.e., the MFP 1) may execute the job regardless of the continuation or discontinuation of the session. In this case, the MFP 1 as the communication target acquires the job execution command, and overwrites the job conditions currently held in the MFP 1 with the job conditions included in the acquired job execution command. In this process, all job conditions held in the MFP 1 may be deleted or reset to default conditions to set the job conditions included in the job execution command. Alternatively, if one of the job conditions held in the MFP 1 is inconsistent with the corresponding one of the job conditions included in the job execution command, the job condition held in the MFP 1 may be overwritten with the corresponding job condition in the job execution command, which is given priority. If one of the job conditions held in the MFP 1 is consistent with the corresponding one of the job conditions included in the job execution command, the job condition held in the MFP 1 may be maintained. After the job is executed, the MFP 1 may delete the job conditions included in the job execution command to reset the job conditions of the MFP 1 to the default conditions previously registered in the MFP 1.

An example of information fed back from the cloud system 3 will be described.

In the above-described example, the feedback unit 213 of the terminal 2 outputs the text data or the audio data included in the response information. However, the output information is not limited thereto. Based on information included in the response information, the feedback unit 213 may read all or parts of text data stored in a memory of the terminal 2, and may generate the output information by combining the read parts of the text data. TABLE 2 given below illustrates examples of the response information and feedback fed back to the terminal 2 from the cloud system 3.

TABLE 2

| Name | Value | Processing of application |
|---|---|---|
| Action | COPY_PARAMETER_SETTING | Prompt user to input job setting value |
| | COPY_CONFIRM | Prompt user to confirm job setting value |
| | COPY_EXECUTE | Execute copy job |
| Parameter | Print side | Change setting value of print side |
| | Quantity | Change setting value of quantity |
| | *Other parameters specifiable as job setting values | |
| Response | Text | Feed back contents specified in text to user |

As illustrated in TABLE 2, an action such as "COPY_PARAMETER_SETTING" for prompting the user to input the job setting value or "COPY_CONFIRM" for prompting the user to confirm the job setting value, for example, is included in the response information and fed back to the terminal 2 from the cloud system 3.

The feedback unit 213 determines the feedback to be output to the user in accordance with the action, parameter, and response included in the response information. Information as in TABLE 2 may be stored in a memory of the terminal 2 such that the feedback unit 213 refers to the stored information to determine the contents of the feedback. Although TABLE 2 illustrates examples of the response information of the copy job, "PARAMETER_SETTING" for prompting the user to input the job setting value and "CONFIRM" for prompting the user to confirm the job setting value may also be used as the action in the response information of the print, scan, or FAX job similarly as in TABLE 2. The response information may include at least one of the action and parameter and the response.

Further, for example, the setting value of the print side such as single-sided or double-sided or the parameter such as the number of copies is included in the response information and fed back to the terminal 2. Further, if there is an unspecified necessary parameter, a message for prompting the user to input (i.e., specify) the unspecified necessary parameter is included in the response information as the response and fed back to the terminal 2.

When the user responds with an utterance "Yes" to the above-described input confirmation feedback such as "Do you confirm to execute job?" for example, the MFP 1 executes the job. If the job is successfully completed, a completion message such as "Job completed. Make sure to remove document," for example, is output both in sound and text via the terminal 2.

In the event of an error such as paper shortage, for example, job confirmation feedback with a message such as "No paper fed. Reload paper and continue job or cancel job" is output via the terminal 2. If the user reloads paper in the MFP 1 and utters a word "Continue" in response to the job confirmation feedback, an instruction to continue the job is issued to the MFP 1, and the MFP 1 resumes the job. If the user utters a word "Cancel" to issue an instruction to cancel the job in response to the job confirmation feedback, the instruction to cancel the job is transmitted to the MFP 1, and a part of the job unfinished at the time of occurrence of the error is cancelled. Then, confirmation feedback with a message such as "Job cancelled," for example, is output in sound and text via the terminal 2. For the cloud service unit 300 of the cloud system 3 to transmit an inquiry (e.g., transmit a UI for displaying the inquiry) to the terminal 2 in accordance with the capability and state of the operation target (e.g., the MFP 1), information of the capability and state of the MFP 1 is transmitted to the cloud system 3.

The following description will be given of basic management methods of managing the capability and state of the MFP 1.

A first management method of the embodiment will be described.

Figure 16:
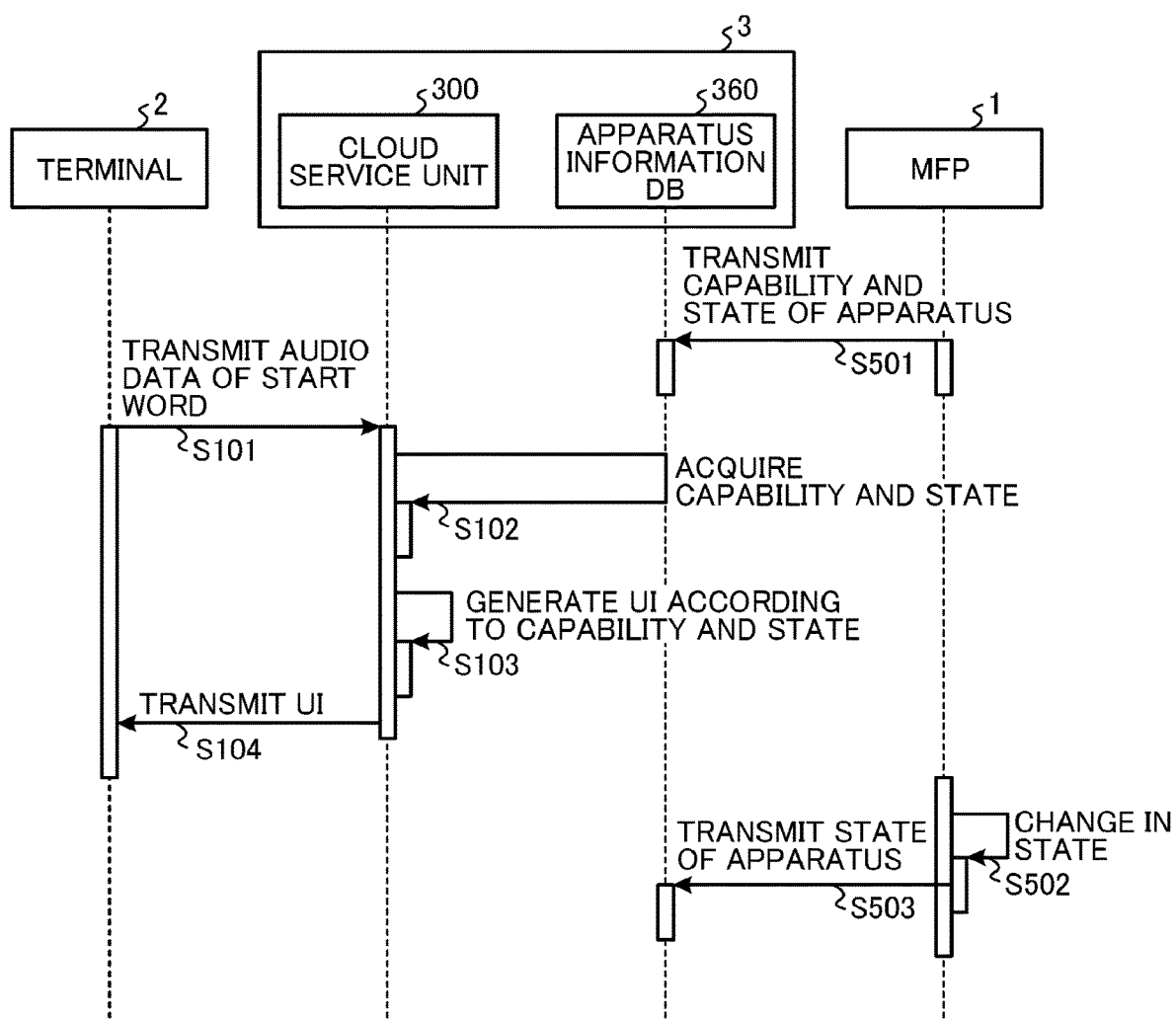
FIG. 16 is a sequence diagram illustrating an exemplary sequence of steps of a first management method of the embodiment.

FIG. 16 is a sequence diagram illustrating an exemplary sequence of steps of the first management method. As illustrated in FIG. 16, the MFP 1 first transmits the information of the capability and state of the MFP 1 to the cloud system 3 (step S501). In the cloud system 3, the management unit 330 (i.e., the DB management unit 337) receives and records the transmitted information of the capability and state of the MFP 1 in the apparatus information DB 360.

Thereafter, the user utters a start word, for example, to instruct the terminal 2 (i.e., the smart speaker in the present example) to start the cloud service, and the terminal 2 transmits audio data of the start word to the cloud system 3 together with the device ID of the terminal 2 (step S101). In the cloud service unit 300, the operation voice conversion unit 310 executes processes such as the conversion of the audio data into text data and the interpretation of the text data, and transmits the interpretation result to the management unit 330. The management unit 330 receives the interpretation result, and the execution determination unit 335 determines the interpretation result as the instruction to execute the process described by the start word. Then, the DB management unit 337 acquires, from the apparatus information DB 360, the capability and state of the MFP 1 corresponding to the device ID (step S102).

The management unit 330 (i.e., the notification unit 336) generates a UI in accordance with the information of the capability and state of the MFP 1 acquired from the apparatus information DB 360 (step S103), and transmits the UI to the terminal 2 via the operation voice conversion unit 310 (i.e., the output unit 314) (step S104).

The MFP 1 transmits the information of the apparatus state of the MFP 1 to the cloud system 3 (step S503) periodically or when the apparatus state of the MFP 1 changes (step S502).

In the present example, the MFP 1 periodically transmits the information of the apparatus state thereof to the cloud system 3. Alternatively, the management unit 330 (i.e., the apparatus information acquisition unit 334) of the cloud system 3 may periodically access the MFP 1 and acquire therefrom the information of the apparatus state.

According to the first management method, the information of the capability or state of the MFP 1 is recorded at each change in the capability or state of the MFP 1.

A second management method of the embodiment will be described.

Figure 17:
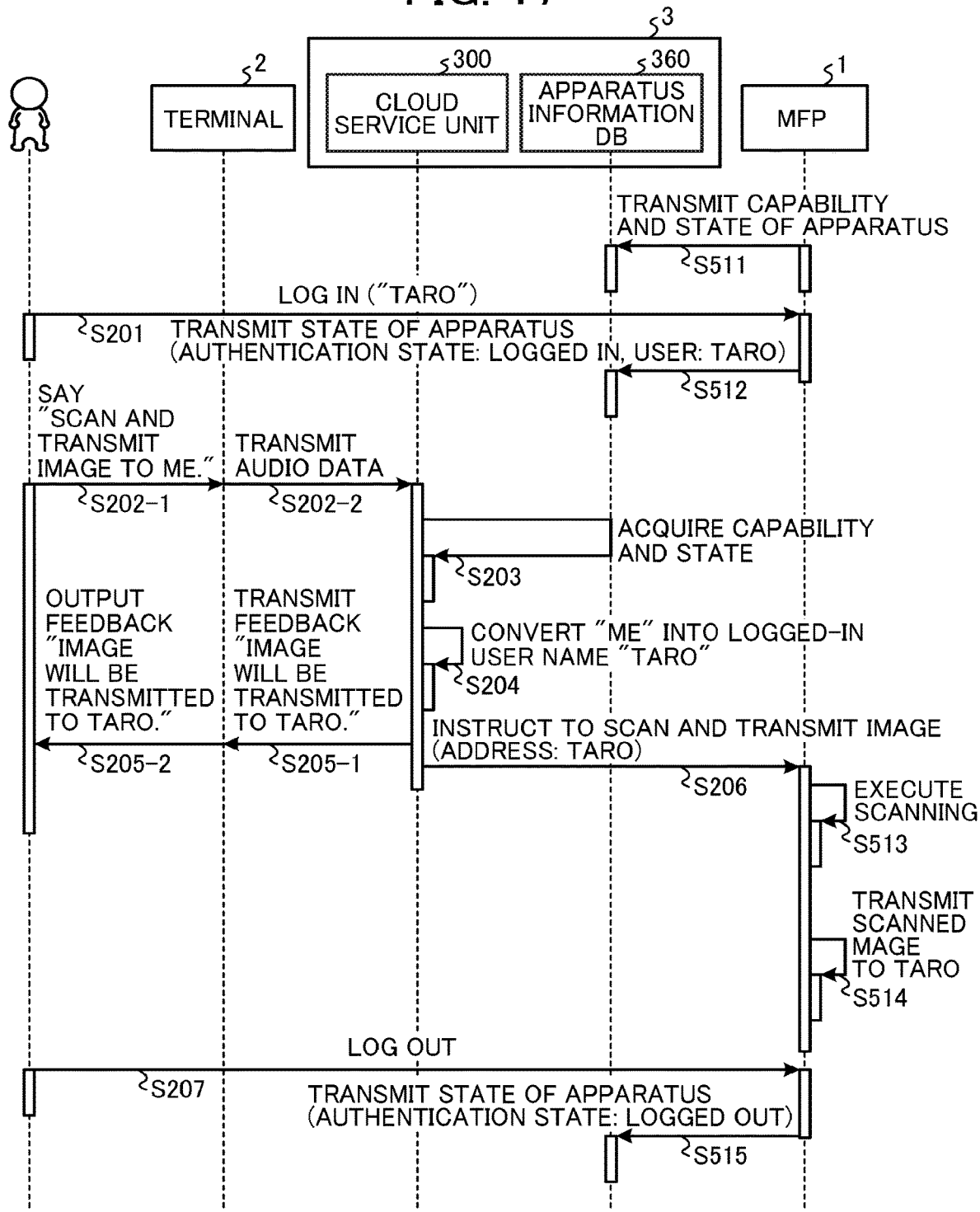
FIG. 17 is a sequence diagram illustrating an exemplary sequence of steps of a second management method of the embodiment.

FIG. 17 is a sequence diagram illustrating an exemplary sequence of steps of the second management method. As illustrated in FIG. 17, the MFP 1 first transmits the information of the capability and state of the MFP 1 to the cloud system 3 (step S511). In the cloud system 3, the management unit 330 (i.e., the DB management unit 337) receives and records the transmitted information of the capability and state of the MFP 1 in the apparatus information DB 360.

Then, the user logs in to the MFP 1 by operating the operation device 16 of the MFP 1 (step S201). In FIG. 17, the user thus-logged in to the MFP 1 (i.e., the logged-in user) is illustrated as "Taro," for example. Since the state of the MFP 1 (i.e., authentication state in this case) is changed, the MFP 1 transmits login information (i.e., AUTHENTICATION STATE: LOGGED IN, USER: TARO) to the cloud system 3 as the information representing the state of the MFP 1 (step S512). The login information includes information for identifying the logged-in user. The login information may also include information such as the login state and an electronic mail address or FAX number associated with the logged-in user. Then, in the cloud system 3, the management unit 330 (i.e., the DB management unit 337) receives the transmitted information and updates the apparatus information DB 360.

If the user then utters an instruction "Scan and transmit image to me," for example, to the terminal 2, the voice of the user is acquired as audio data by the terminal 2 (i.e., the acquisition unit 211) (Step S202-1). The terminal 2 (i.e., the communication control unit 212) transmits the audio data of the utterance "Scan and transmit image to me" to the cloud system 3 (Step S202-2). In this case, the operation voice conversion unit 310 (i.e., the interpretation unit 313) of the cloud system 3 transmits actions "SCAN, TRANSMIT" and a parameter "ADDRESS=ME" to the management unit 330 as the interoperation result. Herein, "ME" associated with the parameter "ADDRESS" is an example of user identifying information. The user identifying information is information for identifying the user of the MFP 1 or the terminal 2. The user identifying information is a word or phrase included in the user utterance (i.e., user request) to denote the user or specify the address. It is desirable that the user identifying information is a word or phrase used in spoken language or in natural instruction, such as "me" or "myself," for example. The cloud system 3 or the MFP 1, however, is unable to uniquely identify the user name or the address information such as the electronic mail address based on the user identifying information alone. The cloud system 3 or the MFP 1 therefore performs a process of identifying the user name or the address information based on information of the logged-in user stored in the MFP 1, for example.

Then, the DB management unit 337 acquires, from the apparatus information DB 360, the capability and state of the MFP 1 corresponding to the device ID of the terminal 2 (step S203). The information of the state of the MFP 1 includes the login information representing the logged-in user. Thus, the DB management unit 337 also acquires the login information.

Then, the execution determination unit 335 executes the necessary parameter fulfillment determination (step S204). Herein, the address parameter includes the user identifying information "me." Thus, the execution determination unit 335 converts the user identifying information "me" into the name of the logged-in user. In the present example, the execution determination unit 335 converts the user identifying information "me" into "Taro," which is the name of the user currently logged in to the MFP 1, i.e., the user name acquired by the DB management unit 337 at step S203. The execution determination unit 335 may convert the user identifying information "me" into the address information, such as the electronic mail address or the FAX number, instead of the user name. The address information may be acquired from the MFP 1 at step S201, or may be previously registered in the HDD 34 of the cloud system 3, for example. After the execution determination unit 335 converts the user identifying information and determines in the necessary parameter fulfillment determination that there is no unspecified necessary parameter, the execution determination unit 335 instructs the notification unit 336 to generate feedback information.

Since the address parameter is converted into "Taro," the notification unit 336 generates feedback information by replacing "me" in a feedback response "Image will be transmitted to me" with "Taro." If the user identifying information is converted into the address information, the address information may be fed back instead of the user name "Taro."

The procedure of the second management method may include the input confirmation feedback for prompting the user to confirm the instruction. In the exemplary procedure illustrated in FIG. 17, however, the voice operation system 100 simply notifies the user of the contents of the received instruction. That is, in the cloud service unit 300, the notification unit 336 transmits feedback information (i.e., audio data of a message "Image will be transmitted to Taro") to the terminal 2 via the operation voice conversion unit 310 (i.e., the output unit 314) (step S205-1). Then, the terminal 2 (i.e., the feedback unit 213) outputs audio feedback with the message "Image will be transmitted to Taro" (step S205-2).

Further, in the management unit 330 of the cloud service unit 300, the execution instruction unit 333 transmits to the MFP 1 the job execution command obtained through the conversion process by the interpretation result conversion unit 332, to thereby instruct the MFP 1 to execute the job (step S206). In this case, the MFP 1 is instructed to execute the job based on the job execution command in which the address is converted into "Taro." In this step, the management unit 330 may transmit the user name to the MFP 1 as the address, or may transmit the address information such as the electronic mail address or the FAX number to the MFP 1 in place of or in addition to the user name.

In response to the job execution command, the MFP 1 executes scanning (step S513), and transmits a scanned image to the address of the user Taro (step S514). In this step, the MFP 1 may search through the address information stored in a memory such as the HDD 13 for the address information item associated with the user name "Taro," and may transmit the scanned image to the address corresponding to the retrieved address information item. If the address information is acquired from the cloud system 3 in place of or in addition to the user name, the scanned image may be transmitted based on the acquired address information.

Thereafter, the user Taro logs out from the MFP 1 by operating the operation device 16 of the MFP 1 (step S207). Thereby, the state (i.e., authentication state) of the MFP 1 is changed. The MFP 1 therefore transmits logout information (i.e., AUTHENTICATION STATE: LOGGED OUT) to the cloud system 3 as the information representing the state of the MFP 1 (step S515). Then, in the cloud system 3, the management unit 330 (i.e., the DB management unit 337) receives the transmitted information, and updates the apparatus information DB 360.

In the above-described example, the user name is set as the address. However, the address is not limited thereto, and may be the user ID. In this case, the execution instruction unit 333 transmits to the MFP 1 a job execution command specifying that the user name "Taro" or the user ID represents the address, and the MFP 1 retrieves and extracts the address information (e.g., the electronic mail address) associated with the user name "Tam" or the user ID from a memory of the MFP 1 such as the HDD 13.

If the apparatus information DB 360 of the cloud system 3 stores the electronic mail address of the logged-in user, the electronic mail address of the logged-in user may be set as the address in the cloud system 3. In this case, the job execution command includes the electronic mail address, and thus the process of retrieving the address information in the MFP 1 is omitted.

As described above, according to the second management method, the user identifying information such as "me" is converted into the information of the logged-in user currently logged in to the MFP 1. Therefore, the user is identified even if the user inputs an operation instruction to the terminal 2 with an utterance such as "Scan and transmit image to me," which includes a commonly-used plain expression such as "me," for example. Consequently, the user is not required to specify their identification to the terminal 2 each time the user specifies the user themselves as the address. The second management method therefore enables the user to intuitively issue an instruction, improving user convenience. In the second management method, when the authentication state of the MFP 1 changes, the change in the state of the MFP 1 is recorded in the cloud system 3 and referred to by the cloud system 3 to set the transmission destination of the scanned data.

A third management method of the embodiment will be described.

Figure 18:
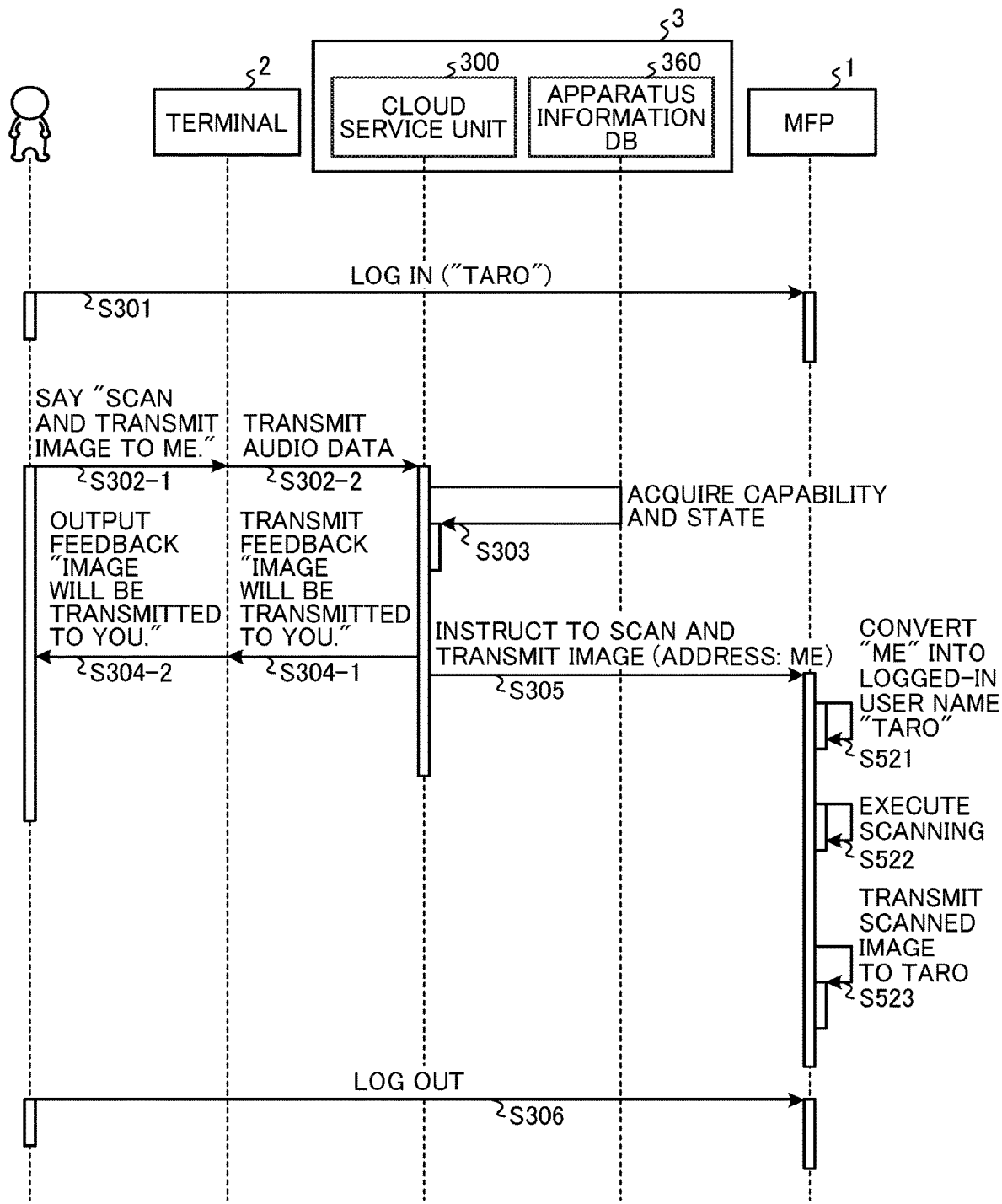
FIG. 18 is a sequence diagram illustrating an exemplary sequence of steps of a third management method of the embodiment.

FIG. 18 is a sequence diagram illustrating an exemplary sequence of steps of the third management method. FIG. 18 illustrates a sequence staring with the step at which the user logs in to the MFP 1. A major difference of the sequence of FIG. 18 from the sequence of FIG. 17 is that the MFP 1 does not transmit to the cloud system 3 the information representing the login state of the MFP 1. With the information of the login state of the MFP 1 not transmitted to the cloud system 3 from the MFP 1, the number of data transmissions to the cloud system 3 is substantially reduced, which leads to a reduction in cost and load on the cloud system 3.

The following description will focus on differences of the sequence of FIG. 18 from the sequence of FIG. 17. For comparison with the sequence of FIG. 17, the user utterance "Scan and transmit image to me" illustrated in FIG. 17 is used in FIG. 18.

The user first logs in to the MFP 1 by operating the operation device 16 of the MFP 1 (step S301). The user then utters the instruction "Scan and transmit image to me" to the terminal 2. The voice of the user is acquired as audio data by the terminal 2 (i.e., the acquisition unit 211) (step S302-1). The terminal 2 (i.e., the communication control unit 212) transmits the audio data of the utterance "Scan and transmit image to me" to the cloud system 3 (step S302-2). In this case, the operation voice conversion unit 310 (i.e., the interpretation unit 313) of the cloud system 3 transmits the actions "SCAN, TRANSMIT" and the parameter "ADDRESS=ME" to the management unit 330 as the interoperation result.

Then, the DB management unit 337 acquires, from the apparatus information DB 360, the capability and state of the MFP 1 corresponding to the device ID of the terminal 2 (step S303). According to the third management method, even if the login state of the MFP 1 is changed, the MFP 1 does not notify the cloud system 3 of the change. Therefore, the information of the state of the MFP 1 acquired in this step does not include the login information representing the logged-in user.

In the management unit 330 of the cloud service unit 300, therefore, based on the determination by the execution determination unit 335, the notification unit 336 transmits feedback information (i.e., audio data of a message "Image will be transmitted to you") to the terminal 2 via the operation voice conversion unit 310 (i.e., the output unit 314) (step S304-1). Herein, "you" is a default expression included in the feedback in response to the expression "me." Then, the terminal 2 (i.e., the feedback unit 213) outputs audio feedback with the message "Image will be transmitted to you" (step S304-2).

Further, in the management unit 330 of the cloud service unit 300, the execution instruction unit 333 transmits a job execution command to the MFP 1, to thereby instruct the MFP 1 to execute the job (step S305). In this job execution command, the address is "me" and thus remains ambiguous.

The MFP 1 receives the job execution command with the address set as "me," and converts the address into the user name of the logged-in user (i.e., "Taro" in this example) (step S521). Specifically, since the address parameter includes the user identifying information "me," the voice control service unit 112 of the MFP 1 converts the user identifying information "me" into the user name "Taro" of the logged-in user. The MFP 1 identifies the address information based on the user name. The voice control service unit 112 may convert the user identifying information "me" into the address information instead of the user name.

Then, similarly as in steps S513 and S514 in FIG. 17, the MFP 1 executes scanning (step S522) and transmits a scanned image to the address of the user Taro (step S523).

Thereafter, the user Taro logs out from the MFP 1 by operating the operation device 16 of the MFP 1 (step S306). According to the third management method, the conversion of the address is executed in the MFP 1. After the logout operation on the MFP 1, therefore, the notification of the change in the state of the MFP 1 to the cloud system 3 is omitted.

A fourth management method of the embodiment will be described.

Figure 19:
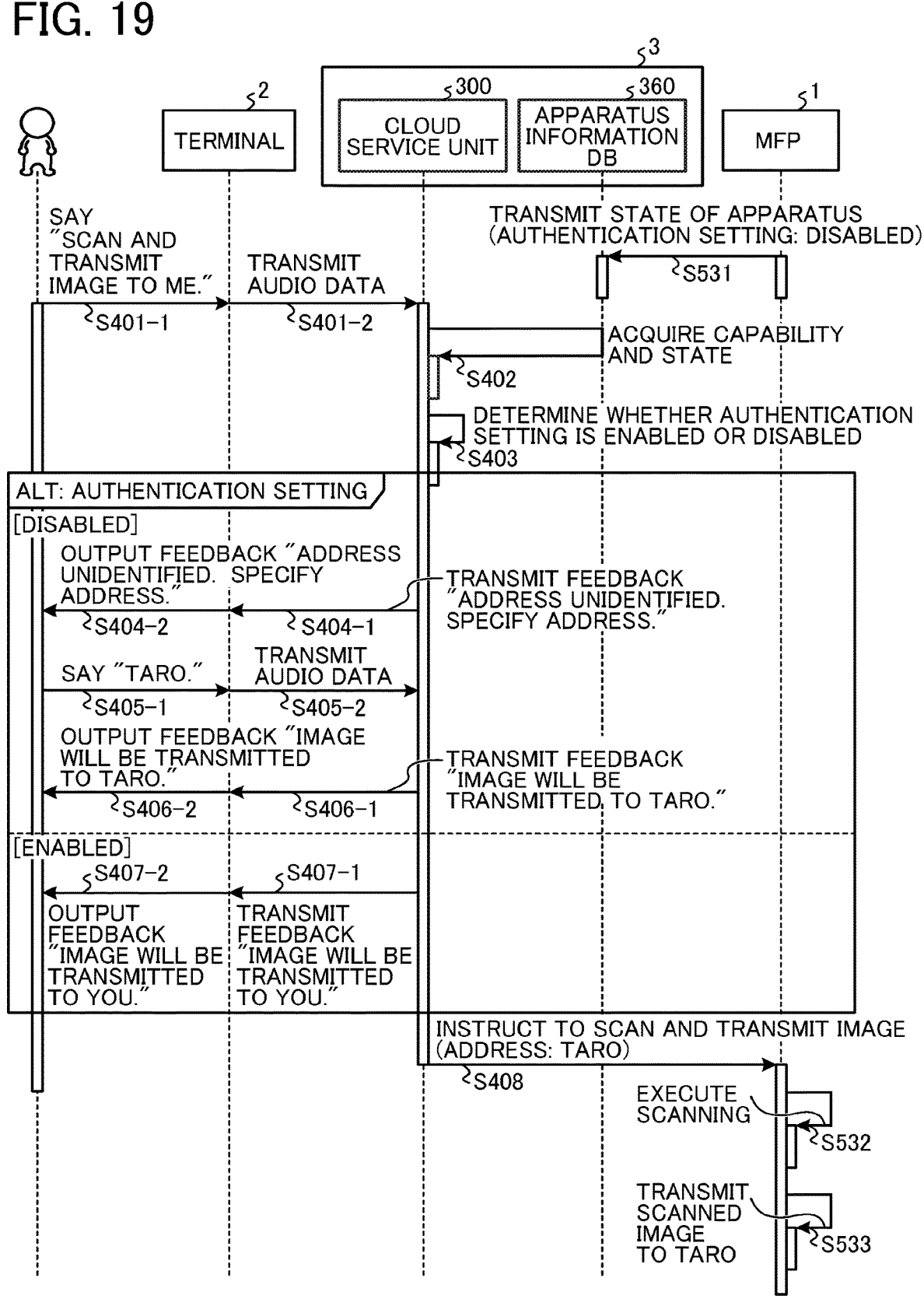
FIG. 19 is a sequence diagram illustrating an exemplary sequence of steps of a fourth management method of the embodiment.

FIG. 19 is a sequence diagram illustrating an exemplary sequence of steps of the fourth management method. The sequence illustrated in FIG. 19 is different from the sequence illustrated in FIG. 17 in that the apparatus information DB 360 stores information of an authentication setting (i.e., whether the authentication setting is enabled or disabled).

The MFP 1 has an authentication function of authenticating the user based on a login ID or password to set an available function for each user. The MFP 1 is capable of setting whether to execute the authentication function, i.e., switching the authentication setting between enabled or disabled. If the transmission destination is unidentified when the authentication setting is disabled, the data transmission is not executed. Consequently, the number of communications of the MFP 1 with the cloud system 3 is substantially reduced, leading to a reduction in cost.

The following description will focus on major differences of the sequence of FIG. 19 from the sequence of FIG. 17. For comparison with the sequence of FIG. 17, the user utterance "Scan and transmit image to me" illustrated in FIG. 17 is used in FIG. 19.

As illustrated in FIG. 19, the MFP 1 first notifies the cloud system 3 that the authentication setting is disabled (step S531). In the cloud system 3, the management unit 330 (i.e., the DB management unit 337) receives and records the notified information in the apparatus information DB 360. For example, the management unit 330 (i.e., the DB management unit 337) sets the information of the authentication setting of the MFP 1 as disabled in the apparatus information DB 360.

When the user utters the instruction "Scan and transmit image to me," for example, to the terminal 2, the voice of the user is acquired as audio data by the terminal 2 (i.e., the acquisition unit 211) (step S401-1). The terminal 2 (i.e., the communication control unit 212) transmits the audio data of the utterance "Scan and transmit image to me" to the cloud system 3 (step S401-2). In this case, the operation voice conversion unit 310 (i.e., the interpretation unit 313) of the cloud system 3 transmits the actions "SCAN, TRANSMIT" and the parameter "ADDRESS=ME" to the management unit 330 as the interoperation result.

Then, the DB management unit 337 acquires, from the apparatus information DB 360, the capability and state of the MFP 1 corresponding to the device ID of the terminal 2 (step S402). Then, the execution determination unit 335 determines whether the authentication setting is enabled or disabled (step S403).

If the authentication setting is disabled, the notification unit 336 generates input lack feedback information, and transmits the input lack feedback information (i.e., audio data of a message "Address unidentified. Specify address") to the terminal 2 via the operation voice conversion unit 310 (i.e., the output unit 314) (step S404-1). Then, the terminal 2 (i.e., the feedback unit 213) outputs audio feedback with the message "Address unidentified. Specify address" (step S404-2).

If the user responds to the feedback with an utterance "Taro," the voice of the user is acquired as audio data by the terminal 2 (i.e., the acquisition unit 211) (step S405-1). The terminal 2 (i.e., the communication control unit 212) transmits the audio data of the utterance "Taro" to the cloud system 3 (step S405-2). In the cloud system 3, the execution determination unit 335 executes the necessary parameter fulfillment determination. With the transmission of the audio data of the utterance "Taro," the execution determination unit 335 determines that there is no unspecified necessary parameter. Then, the notification unit 336 transmits audio data of a message "Image will be transmitted to Taro" to the terminal 2 via the operation voice conversion unit 310 (i.e., the output unit 314) (step S406-1). Then, the terminal 2 (i.e., the feedback unit 213) outputs audio feedback with the message "Image will be transmitted to Taro" (step S406-2).

In the cloud service unit 300, the management unit 330 (i.e., the execution instruction unit 333) transmits a job execution command to the MFP 1, to thereby instruct the MFP 1 to execute the job (step S408).

In response to the job execution command, the MFP 1 executes scanning (step S532), and transmits a scanned image to the address of the user Taro (step S533). That is, the MFP 1 searches through the address information stored in a memory such as the HDD 13 of the MFP 1 for the address information item associated with the user name, and transmits the scanned image based on the retrieved address information item.

If it is determined at step S403 that the authentication setting is enabled, the notification unit 336 transmits audio data of a message "Image will be transmitted to you" to the terminal 2 via the operation voice conversion unit 310 (i.e., the output unit 314) (step S407-1). Then, the terminal 2 (i.e., the feedback unit 213) outputs audio feedback with the message "Image will be transmitted to you" (step S407-2).

In the cloud service unit 300, the management unit 330 (i.e., the execution instruction unit 333) transmits the job execution command to the MFP 1, to thereby instruct the MFP 1 to execute the job (step S408). In this case, the management unit 330 (i.e., the execution instruction unit 333) instructs the MFP 1 to execute the job by setting "Taro" as the address based on the login information (i.e., AUTHENTICATION STATE: LOGGED IN, USER: TARO) transmitted to the cloud system 3 by the MFP 1 at step S512 in FIG. 17 as the information representing the state of the MFP 1.

In response to the job execution command, the MFP 1 executes scanning (step S532), and transmits a scanned image to the address of the user Taro (step S533).

The procedure of the present example includes the steps at which the cloud system 3 checks with the user of the terminal 2 about the transmission destination when the authentication setting is disabled and the transmission destination (i.e., the address) is unidentified (steps S404-1 and S404-2). As an alternative to the transmission of the inquiry about the transmission destination, the cloud system 3 may be equipped with an alarm device that transmits, to the terminal 2, alarm information such as a signal for outputting alarm sound or data for alarming the user, for example. This configuration enables the user to notice that the authentication setting of the MFP 1 is disabled, and to reset (i.e., enable) the authentication setting in the cloud system 3 by operating the MFP 1. With the authentication setting thus switched to enabled, the cloud system 3 is able to use the stored user name "Tam" as the transmission destination.

An operation screen of the MFP 1 will be described.

Figure 20:
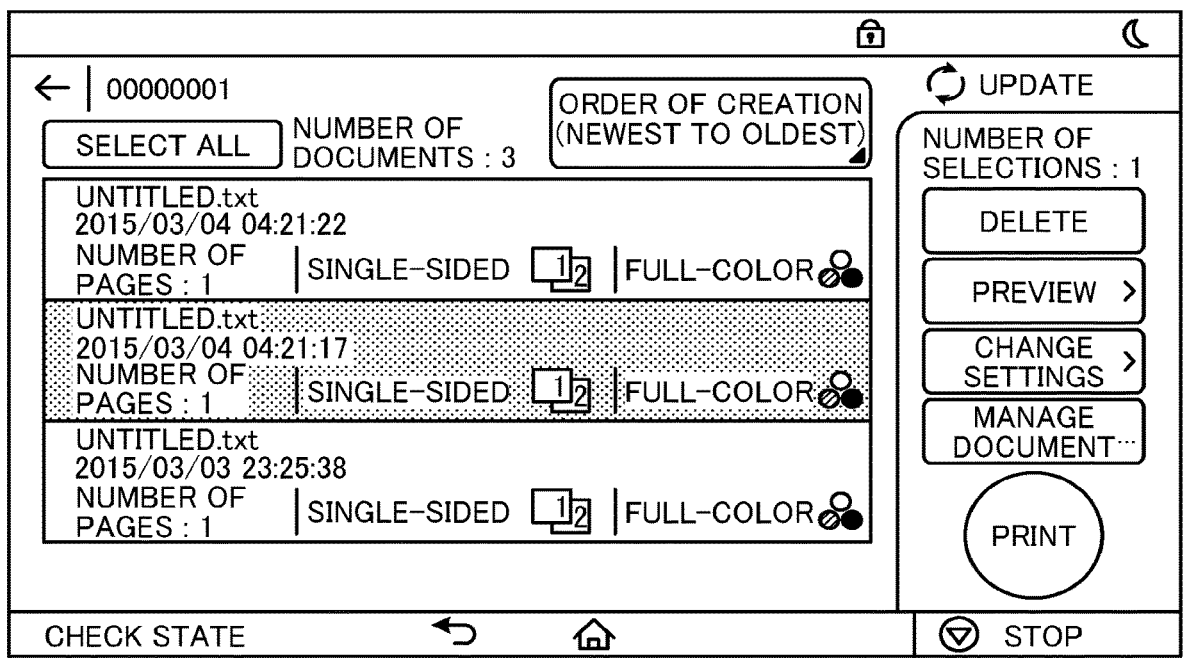
FIG. 20 is a diagram illustrating an example of an operation screen of the MFP of the embodiment.

FIG. 20 is a diagram illustrating an example of the operation screen of the MFP 1. FIG. 20 illustrates an example of a preview target section list screen. When the user inputs the operation instruction to the terminal 2 (i.e., the smart speaker) through the interaction with the terminal 2 and the cloud system 3 determines that the parameters representing the job conditions for executing the job are specified, the cloud system 3 transmits the job execution command to the MFP 1. Then, the display screen on the panel of the operation device 16 of the MFP 1 displays a screen displaying the specified settings, such as the screen illustrated in FIG. 20. FIG. 20 illustrates a selection screen on which the user selects settings. If the settings are uniquely specified, a setting screen of the uniquely specified settings is displayed. When the user presses an execute button displayed on the screen (i.e., a "PRINT" button in the illustrated example), the process is executed with the specified settings.

As described above, in the voice operation system 100 of the embodiment, the terminal 2 is installed with the operation processing program as a platform application program, which communicates with the cloud system 3. When the user speaks to the microphone 29 of the terminal 2, the cloud system 3 analyzes the contents of the user utterance, and operates the MFP 1 to perform the operation specified by the user. That is, the voice input operation is performed.

Thereby, a command for a complicated operation is issued in voice, obviating the need for an operation with a graphical user interface (GUI) on the touch panel 27, for example. This configuration therefore makes the input operation faster and easier even for a user experienced with the operation. Further, the interactive operation support enables a senior or inexperienced user to perform a desired operation faster and with more ease when performing complicated network setting or advanced job setting or when installing a new application program, for example.

Further, since the intention of the user is interpreted based on the text of the user utterance, the process based on the user utterance is determined by the cloud system 3.

Further, as in the foregoing description of the management methods, the user identifying information such as "me" is converted into the information of the user currently logged in to the MFP 1. Therefore, the user is identified even if the user inputs the operation instruction to the terminal 2 in commonly-used plain language. Consequently, the user is not required to specify their identification to the terminal 2 each time the user specifies the user themselves as the address, and thus is able to intuitively issue an instruction. Thereby, user convenience is improved.

Further, for the cloud system 3 to execute the operation specified by the user of the terminal 2 in accordance with the capability and state of the MFP 1, the information of the capability and state of the MFP 1 is transmitted to the cloud system 3 from the MFP 1. According to the present embodiment, the amount of information transmitted to the cloud system 3 from the MFP 1 is minimized, or the number of transmissions of information to the cloud system 3 from the MFP 1 is reduced, as discussed in the foregoing description of the management methods. This configuration suppresses an increase in communication cost depending on the number of data transmissions or the data size. Recording the state of the MFP 1 in the cloud system 3 at each change in the state of the MFP 1 increases the communication cost. According to the embodiment, the MFP 1 transmits necessary information to the cloud system 3 to be used therein. However, the frequency of transmission of such information from the MFP 1 to the cloud system 3 is reduced to once a day, for example, and the frequency of communication for other purposes is reduced. Thereby, communication traffic is substantially reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing system, comprising:
a server including first circuitry and a first memory; and
an information processing apparatus including second circuitry and being connectable to the server via a communication network, wherein
the second circuitry of the information processing apparatus is configured to
acquire, as logged-in user information, information input by a user when the user logs in to the information processing apparatus, and
transmit the logged-in user information to the server, and
the first circuitry of the server is configured to
store the transmitted logged-in user information in the first memory,
acquire a user request to the information processing apparatus based on audio information of voice input via a terminal, the user request including a type of job and user identifying information,
replace the user identifying information included in the acquired user request with the acquired logged-in user information stored in the first memory to generate a modified user request, the user identifying information specifying address information of the user, and
transmit the modified user request including the acquired logged-in user information to the information processing apparatus to instruct the information processing apparatus to execute the user request.

2. The information processing system of claim 1, wherein the second circuitry of the information processing apparatus is further configured to enable or disable an authentication setting, and
wherein when the authentication setting is disabled, the first circuitry of the server is configured to replace the user identifying information included in the user request with user information acquired from the voice input via the terminal.

3. The information processing system of claim 1, wherein the second circuitry of the information processing apparatus is further configured to enable or disable an authentication setting, and
wherein when the authentication setting is disabled and the user request includes the user identifying information, the first circuitry of the server is further configured to transmit alarm information to the terminal.

4. The information processing system of claim 1, wherein the information processing apparatus further includes a second memory to store address information of the user, and
wherein when the user request requests data transmission to an address of the user, the second circuitry of the information processing apparatus is further configured to use the address information in the second memory to execute setting of the data transmission to the address of the user.

5. The information processing system of claim 1, wherein the first circuitry of the server is further configured to
convert the audio information of the voice input via the terminal into text information,
interpret the user request based on the text information, and transmit audio information to the terminal in response to the user request.

6. The information processing system of claim 4, wherein the user identifying information included in the user request acquired by the first circuitry specifies a user of the terminal or the information processing apparatus.

7. The information processing system of claim 1, wherein the first circuitry is further configured to replace the user identifying information with one of an electronic mail address and a fax number.

8. An information processing system, comprising:
a server including first circuitry; and
an information processing apparatus including second circuitry and being connectable to the server via a communication network,
the first circuitry of the server is configured to
transmit a user request to the information processing apparatus based on audio information of voice input via a terminal, the user request including a type of job and user identifying information, and
the second circuitry of the information processing apparatus is configured to
acquire, as logged-in user information, information input by a user when the user logs in to the information processing apparatus,
replace the user identifying information included in the user request with the acquired logged-in user information to generate a modified user request, the user identifying information specifying address information of the user, and
execute the modified user request including the acquired logged-in user information.

9. The information processing system of claim 8, wherein the information processing apparatus further includes a memory to store address information of the user, and wherein when the user request requests data transmission to an address of the user, the second circuitry of the information processing apparatus is further configured to use the address information in the memory to execute setting of the data transmission to the address of the user.

10. The information processing system of claim 8, wherein the first circuitry of the server is further configured to
convert the audio information of the voice input via the terminal into text information,
interpret the user request based on the text information, and
transmit audio information to the terminal in response to the user request.

11. The information processing system of claim 8, wherein the user identifying information included in the user request transmitted by the first circuitry specifies a user of the terminal or the information processing apparatus.

12. An information processing apparatus, comprising:
circuitry configured to
receive, via a server, a user request generated based on audio information of voice input via a terminal, the user request including a type of job and user identifying information,
acquire, as logged-in user information, information input by a user when the user logs in to the information processing apparatus,
replace the user identifying information included in the user request received via the server with the acquired logged-in user information to generate a modified user request, the user identifying information specifying address information of the user, and
execute the modified user request including the acquired logged-in user information.

* * * * *